US008427435B2

(12) United States Patent
Takahashi et al.

(10) Patent No.: US 8,427,435 B2
(45) Date of Patent: Apr. 23, 2013

(54) TOUCH SCREEN APPARATUS

(75) Inventors: Seiki Takahashi, Chunan-si (KR);
Byoung-Jun Lee, Chunan-si (KR);
Jun-Pyo Lee, Chunan-si (KR)

(73) Assignee: Samsung Display Co., Ltd. (KR)

( * ) Notice: Subject to any disclaimer, the term of this patent is extended or adjusted under 35 U.S.C. 154(b) by 1185 days.

(21) Appl. No.: 12/266,899

(22) Filed: Nov. 7, 2008

(65) Prior Publication Data
US 2009/0135158 A1 May 28, 2009

(30) Foreign Application Priority Data
Nov. 26, 2007 (KR) .......................... 10-2007-0120766

(51) Int. Cl.
*G06F 3/041* (2006.01)

(52) U.S. Cl.
USPC ...................................................... 345/173

(58) Field of Classification Search ........... 345/173–179
See application file for complete search history.

(56) References Cited

U.S. PATENT DOCUMENTS

| 8,054,261 B2 * | 11/2011 | Pak et al. ........................ 345/87 |
| 2007/0091013 A1 | 4/2007 | Pak et al. |
| 2009/0115735 A1 * | 5/2009 | Chuang ........................ 345/173 |
| 2012/0013572 A1 | 1/2012 | Pak et al. |

FOREIGN PATENT DOCUMENTS

| CN | 1955823 A | 5/2007 |
| CN | 101430467 A | 5/2009 |

* cited by examiner

*Primary Examiner* — Waseem Moorad
(74) *Attorney, Agent, or Firm* — Innovation Counsel LLP

(57) ABSTRACT

There is provided a touch screen apparatus capable of detecting the presence a touch action and a position in a touch region depending on a change in electrical energy of one node of a touch sensor. A touch screen apparatus according to the present invention includes a plurality of pixels for displaying images and a plurality of touch sensors. Each of the plurality of touch sensors includes a first node being provided an electrical energy; a sensor capacitor for changing the electric potential energy of the first node depending on presence a touch action; a first switch for providing a sensing signal to the touch line controlled by the electrical energy of the first node; and a second switch for providing the electrical energy to the first node.

19 Claims, 19 Drawing Sheets

TOUCH SCREEN APPARATUS

This application claims benefit of priority to Korean Patent application No. 10-2007-0120766, filed on Nov. 26, 2007 under 35 U.S.C. 119, the contents of which are herein incorporated by reference in their entirety.

BACKGROUND OF THE INVENTION

1. Field of the Invention

The present invention relates to a touch screen apparatus, and more particularly, to a touch screen apparatus for detecting a touch position by sensing a change in capacitance caused by a user's input operation (touch).

2. Description of the Related Art

In general, a touch screen panel (TSP) is used as an input unit. A resistance-type touch screen apparatus is widely used as such touch screen panel. That is, resistance in the touched region is changed by the force applied when a user touches the touch screen panel. A touch position in the touch screen apparatus can be detected by sensing a resistance change.

Such a resistance-type touch screen panel includes an upper substrate and a lower substrate spaced apart from each other. Typically, lower touch lines are provided on the lower substrate and conductive protrusions are provided on the upper substrate. When a touch screen panel is touched, the conductive protrusion is brought into contact with a touch line by the force applied, and changes the resistance of the touch line positioned under the touch region. The position touched can be detected by sensing the change in the resistance of the touch line through a sensing circuit.

In the conventional resistance-type touch screen panel described above, the conductive protrusion of the upper substrate is brought into contact with a touch line of the lower substrate by the force applied on the touch screen panel. Therefore, it is difficult to secure a desirable process margin when manufacturing the touch screen panel. In addition, when the gap between the upper and lower substrates of the touch screen panel is reduced due to extended use, the conductive protrusion may connect to the touch line even in the absence of an applied force. For this reason, the resistance-type touch screen panel is not a satisfactory input device. Further, when the touch screen panel is integrated with a display panel, the requirements for providing the touch lines on the lower substrate, and conductive protrusions on the upper substrate, further complicates the process and design conditions for manufacturing the display panel.

SUMMARY OF THE INVENTION

The present invention provides a touch screen apparatus which is based on changing the capacitance of a sensor capacitor when a force is applied by a touch.

The present invention further provides a touch screen apparatus which integrates a display panel with a touch screen panel that is based on a change in capacitance of a capacitor resulting from a touch.

According to an aspect of the present invention, a touch screen apparatus is provided which includes a touch line and touch sensors. Each touch sensor includes a first node that can be provided an electrical energy; a sensor capacitor that may be charged by the electrical energy of the first node in response to a touch; a first switch for providing a sensing signal to the touch line based on the electrical energy of the first node; and a second switch for providing the electrical energy to the first node.

The touch screen apparatus may further include a touch sensing unit for outputting a sensing voltage according to the sensing signal of the touch line.

Display elements having at least one touch sensor and at least one pixel for displaying an image may be arranged in a matrix, touch lines may be provided, and the touch lines may extend in a first direction and connects to the touch sensors in the display elements arranged in the first direction. The touch sensing unit may include sensing readers in the touch sensing units that are each connected to the touch lines.

Each sensing reader may include an integration circuit for outputting an output voltage which depends on an amount of current in the sensing signal; an amplifier for amplifying the output voltage of the integration circuit; and an analog-to-digital converter for converting the amplified output voltage into a digital signal.

The touch screen apparatus may further include a pixel having a liquid crystal capacitor in which a pixel electrode is used as a first electrode and a common electrode is used as a second electrode of the liquid crystal capacitor. A first electrode of the sensor capacitor may be formed on the same plane as the pixel electrode to be connected to the first node, and the common electrode may be used as a second electrode of the sensor capacitor.

The touch screen apparatus may further include a reference voltage supply line supplied with a reference voltage and coupled to the first node through a reference capacitor.

The touch screen apparatus may further include gate lines each connected to one of touch sensors, the gate lines each receiving a gate turn-on voltage that is sequentially applied to the gate lines, wherein the first switch is controlled by the first gate line and the second switch is controlled by the second gate line. The turn-on voltage is applied to the second gate line after the turn-on voltage is applied to the first gate line. The first switch is connected to the first node and the touch line.

A first thin film transistor (TFT) may be used to implement the first switch, a gate terminal of the first TFT may be connected to the first gate line, a source terminal of the first TFT may be connected to the first node, and a drain terminal of the first TFT may be connected to the touch line. A second TFT may be used to implement the second switch, a gate terminal of the second TFT may be connected to the second gate line, a source terminal of the second TFT may be connected to a reference voltage supply line supplied with a reference voltage, and a drain terminal of the second TFT may be connected to the first node.

The touch screen apparatus may further include a sensing voltage supply line supplied with a sensing voltage. The first switch may be connected to the sensing voltage supply line and the touch line, and the sensing voltage may be applied as the sensing signal to the touch line depending on the electrical energy of the first node.

The touch screen apparatus may further include gate lines respectively connected to the touch sensors; and a reference capacitor connected to the first gate line and the first node.

The first switch may be controlled by the electrical energy of the first node, and the second switch may be controlled by the second gate line which receives the gate turn-on voltage after the first gate line.

A first TFT may be used to implement the first switch, a gate terminal of the first TFT may be connected to the first node, a source terminal of the first TFT may be connected to the sensing voltage supply line, and a drain terminal of the first TFT may be connected to the touch line. A second TFT may be used as the second switch, a gate terminal of the second TFT may be connected to the second gate line, a source terminal of the second TFT may be connected to the first gate line, and a drain terminal of the second TFT may be connected to the first node, wherein the first TFT may be larger in size than the second TFT.

The touch screen apparatus may further include a reference voltage supply line supplied with a reference voltage. A second TFT may be used to implement the second switch, a gate terminal of the second TFT may be connected to the second gate line, a source terminal of the second TFT may be connected to the reference voltage supply line, and a drain terminal of the second TFT may be connected to the first node.

According to another aspect of the present invention, there is provided touch screen apparatus which includes a touch line; first and second lines; first and second gate lines sequentially supplied with a gate turn-on voltage; and a plurality of touch sensors. Each of the plurality of touch sensors includes a first node; a sensor capacitor connected to the first node and the first line; a reference capacitor connected to the first node and the second line; a first switch for connecting the first node and the touch line controlled by a signal provided to the first gate line; and a second switch for connecting the first node and the second line controlled by a signal provided to the second gate line.

The touch screen apparatus may further include a pixel, comprising a liquid crystal capacitor having a pixel electrode, a liquid crystal layer and a common electrode, wherein the common electrode may be used as the first line.

A storage line or a reference voltage supply line supplied with a reference voltage that is lower in voltage level than a voltage applied to the common electrode may be used as the second line.

A charge on the first node may depend on a capacitance of the sensor capacitor, wherein the touch screen apparatus may further include a sensing reader connected to the touch line whereby an output voltage of the sensing reader may be changed based on the charge on the first node.

The touch screen apparatus may further include a lower substrate having a first electrode of the sensor capacitor formed thereon; and an upper substrate having a second electrode of the sensor capacitor formed thereon, wherein a distance between the first and the second electrodes of the sensor capacitor may be changed by on a touch action.

According to a further aspect of the present invention, there is provided touch screen apparatus which includes a touch line; touch sensors; a first line supplied with a common voltage; a second line supplied with a sensing voltage; first and second gate lines sequentially supplied with a gate turn-on voltage; and a third line. Each touch sensor includes a first node; a sensor capacitor connected to the first node and the first line; a reference capacitor connected to the first node and the first gate line; a first switch for connecting the second line and the touch line controlled by a voltage of the first node; and a second switch for connecting the third line and the first node controlled by a signal provided to the second gate line.

A reference voltage line supplied with a reference voltage or the first gate line may be used as the third line.

A gate turn-off voltage may be used to provide the reference voltage.

First and second TFTs may be respectively used as the first and second switches, wherein the touch screen apparatus may further include a sensing reader which provides an output voltage that depends on the current that flows from the second line to the touch line through the first TFT. The first TFT may be larger in size than the second TFT.

BRIEF DESCRIPTION OF THE DRAWINGS

Preferred embodiments of the present invention can be understood in more detail from the following description taken in conjunction with the accompanying drawings, in which.

DESCRIPTION OF THE PREFERRED EMBODIMENT

Hereinafter, exemplary embodiments of the present invention will be described in detail with reference to the accompanying drawings. However, the present invention is not limited to the embodiments disclosed below but may be implemented into different forms. These embodiments are provided only for illustrative purposes to enable full understanding of the scope of the present invention by those skilled in the art.

Figure 1:
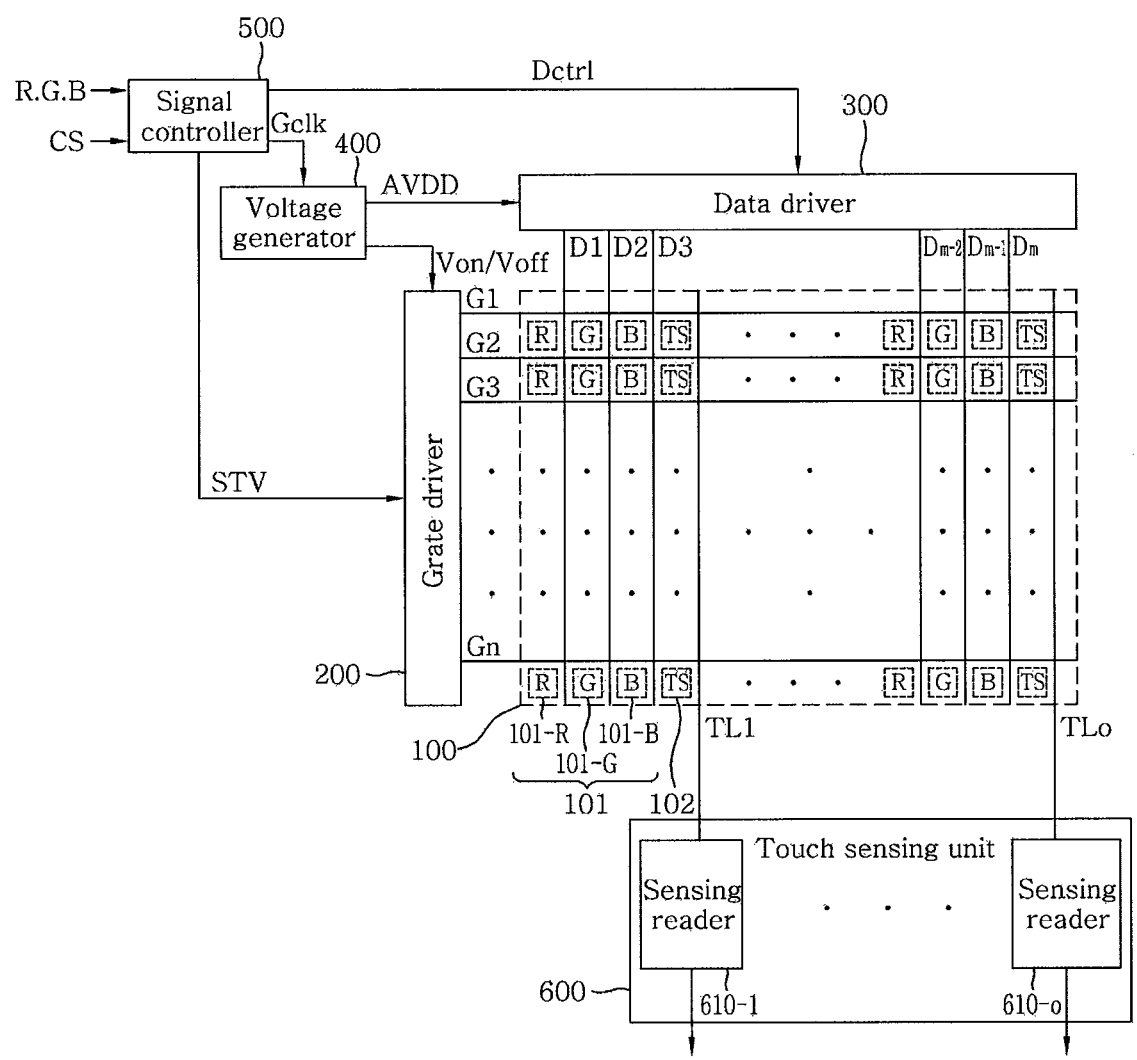
FIG. 1 is a block diagram of a touch screen apparatus according to a first exemplary embodiment of the present invention.
Figure 2:
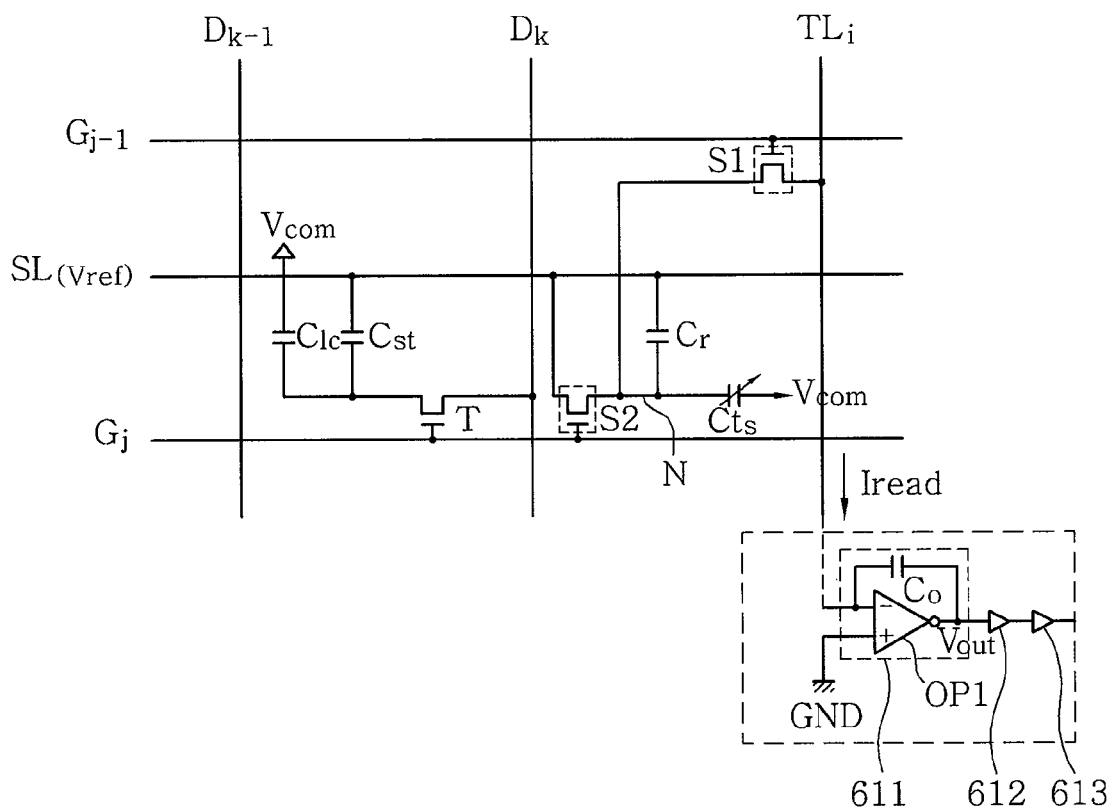
FIG. 2 is an equivalent circuit diagram showing a pixel, a touch sensor and a touch sensing unit configured according to the first exemplary embodiment of the present invention.
Figure 3:
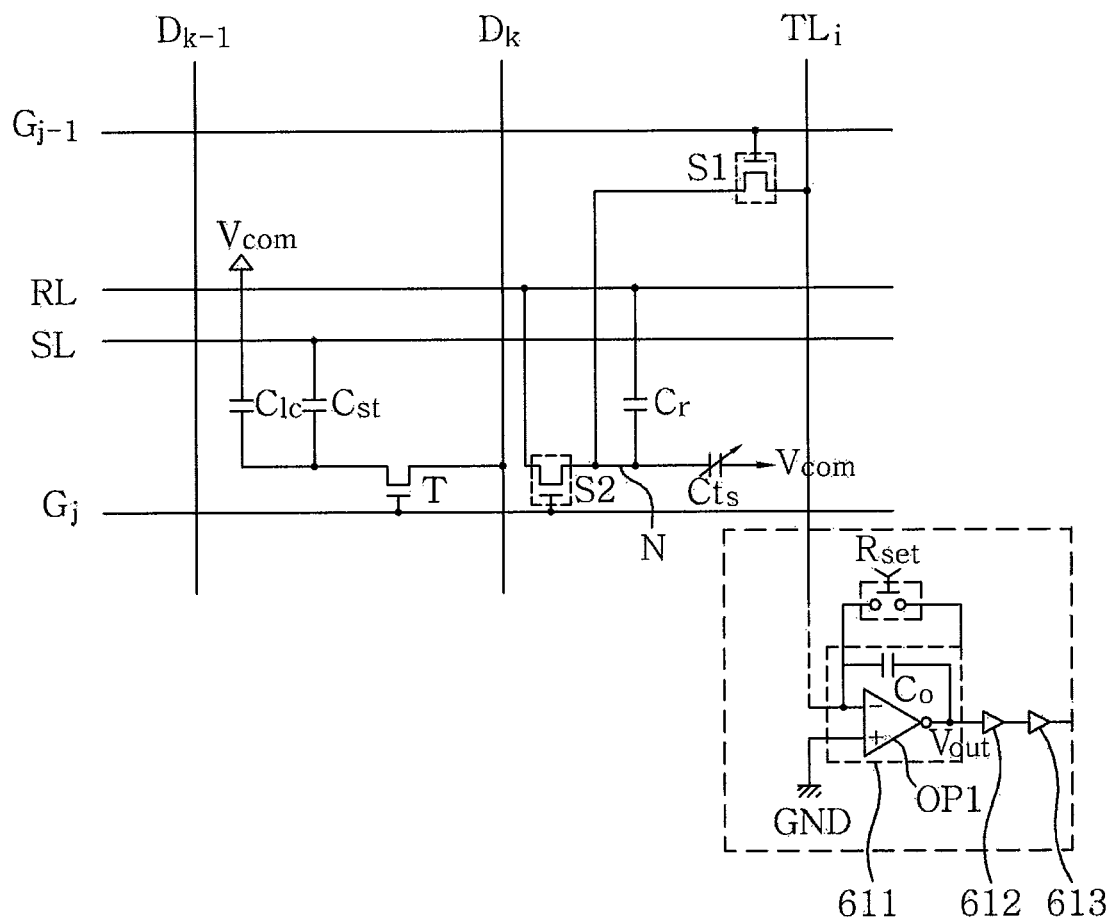
FIG. 3 is an equivalent circuit diagram showing a pixel, a touch sensor and a touch sensing unit configured according to an alternative implementation of the first exemplary embodiment.
Figure 8:
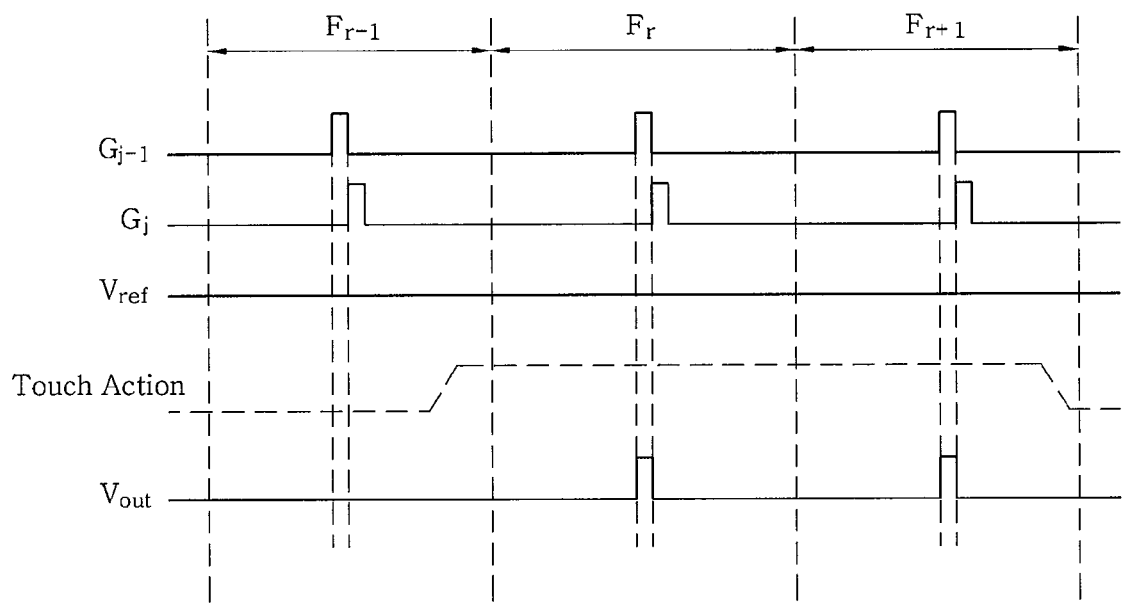
FIG. 8 is a waveform diagram illustrating an operation of a touch screen panel according to the first exemplary embodiment of the present invention.
Figure 9:
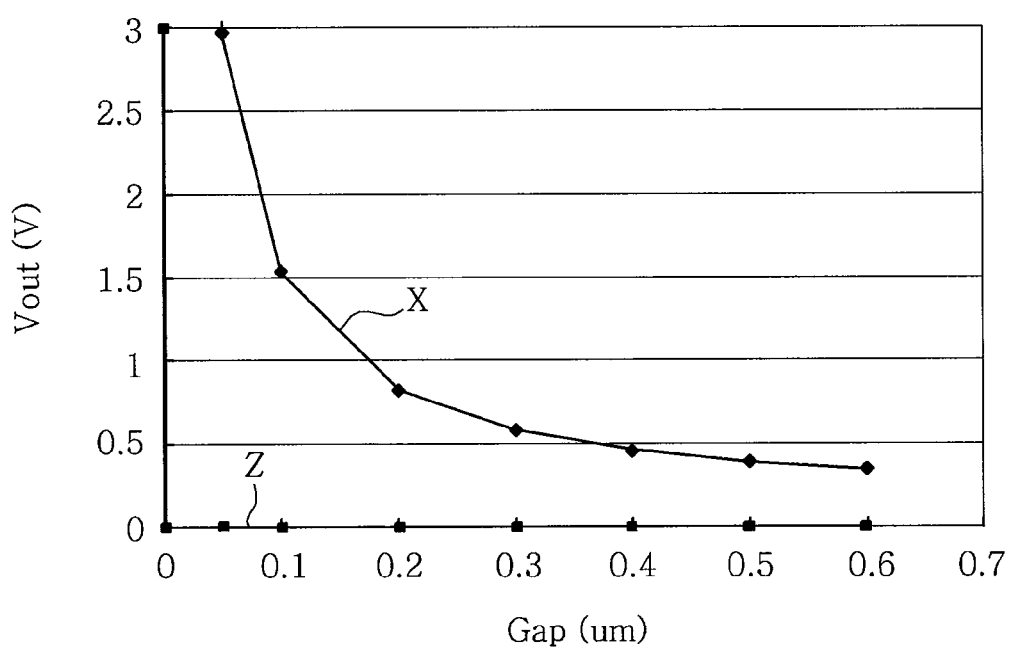
FIG. 9 is a graph based on simulation results, which shows the output voltages of an integration circuit in response to various widths of the cell gap of the touch screen panel according to the first exemplary embodiment of the present invention.
Figure 10:
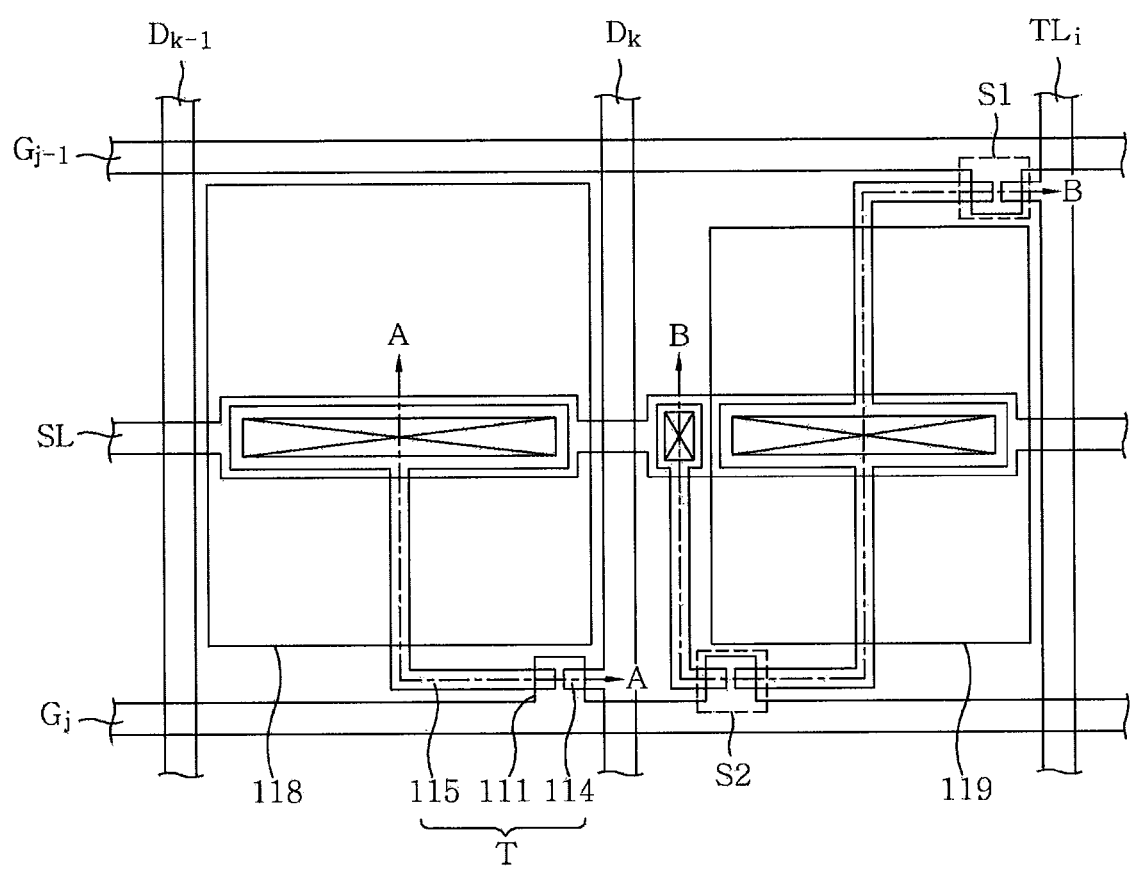
FIG. 10 is a plan view of a circuit that includes a pixel and a touch sensor region according to the first exemplary embodiment of the present invention.
Figure 11:
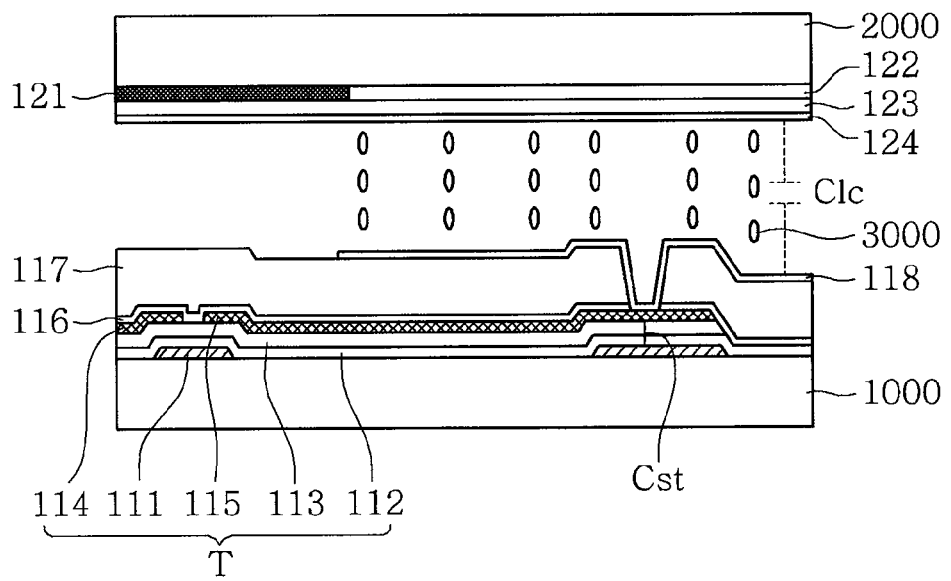
FIG. 11 is a cross-sectional view taken along line A-A in FIG. 10.
Figure 12:
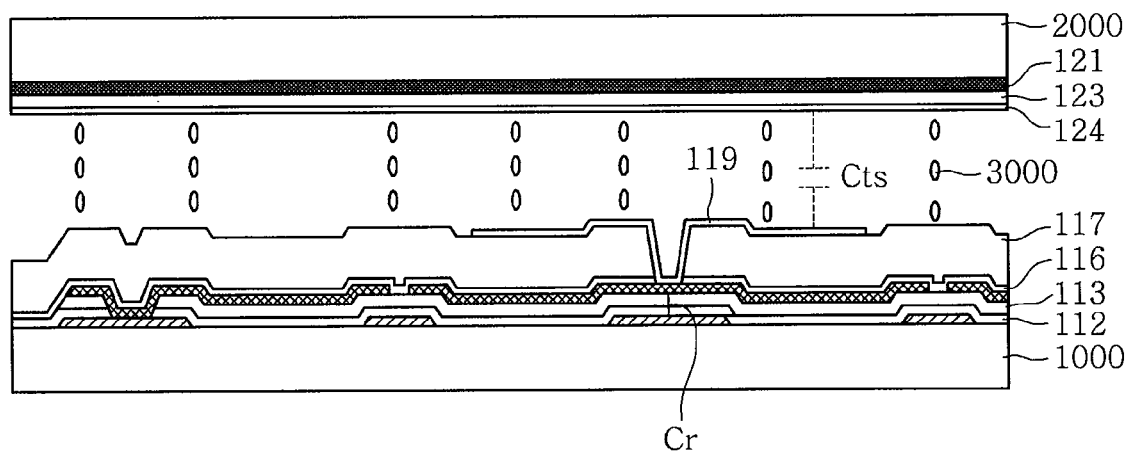
FIG. 12 is a cross-sectional view taken along line B-B in FIG. 10.

FIG. 1 is a block diagram of a touch screen apparatus according to a first exemplary embodiment of the present invention. FIG. 2 is an equivalent circuit diagram showing a pixel, a touch sensor and a touch sensing unit configured according to the first exemplary embodiment of the present invention. FIG. 3 is an equivalent circuit diagram showing a pixel, a touch sensor and a touch sensing unit configured according to an alternative implementation of the first exemplary embodiment. FIGS. 4 to 7 are conceptual illustrations of the operation of the touch sensor according to the first exemplary embodiment of the present invention. FIG. 8 is a waveform diagram illustrating an operation of a touch screen panel according to the first exemplary embodiment of the present invention. FIG. 9 is a graph based on simulation results showing output voltages of an integration circuit unit in response to various widths of the cell gap of the touch screen panel according to the first exemplary embodiment of the present invention. FIG. 10 is a plan view of a circuit including a pixel and a touch sensor region according to the first exemplary embodiment of the present invention, FIG. 11 is a cross-sectional view taken along line A-A in FIG. 10, and FIG. 12 is a cross-sectional view taken along line B-B in FIG. 10.

Referring to FIGS. 1 to 12, the touch screen apparatus according to this embodiment includes a touch screen panel (TSP) 100, a gate driver 200, a data driver 300, a driving voltage generator 400, a signal controller 500 and a touch sensing unit 600.

The TSP 100 includes gate lines G1 to Gn extending in one direction, data lines D1 to Dm extending in a direction intersecting the gate lines G1 to Gn, and touch lines TL1 to Tlo, extending in a direction intersecting the gate lines G1 to Gn. The TSP 100 may further include storage lines SL extending in the same direction as the gate lines G1 to Gn. The TSP 100 is an integrated touch screen and display panel. In this embodiment, a touch panel, a touch screen display panel, a touch display panel and a display panel are referred to as touch screen panels.

A conventional TSP includes two touch lines that are perpendicular to each other, which allows calculation of the vertical and the horizontal coordinates of a touch region, respectively. However, as explained in further details below, the TSP 100 of this embodiment uses the gate lines G1 to Gn to determine horizontal coordinates, thus allowing the number of lines in the TSP 100 to be reduced.

The TSP 100 includes three-color pixels 101 (including single-color (e.g., red, green or blue) pixels 101-R, 101-C, 101-B) connected to the gate lines G1 to Gn and the data lines D1 to Dm, and touch sensors 102 connected to the gate lines G1 to Gn and the touch lines TL1 to TLo.

The pixels 101 and the touch sensors 102 are arranged in a matrix within a display region of the TSP 100. Here, a three-color pixel 101 and one touch sensor 102 defines a display group. In addition, display groups are effectively arranged in a matrix within the display region of the TSP 100. As shown in FIG. 1, the red, green and blue pixels 101-R, 101-G and 101-B and the touch sensor 102 are consecutively arranged in a row direction.

The red, green and blue pixels 101-R, 101-G and 101-B are connected to the data lines D1 to Dm, and the respective touch sensors 102 are connected to the touch lines TL1 to TLo. Thus, one of the touch lines TL1 to TLo is disposed for every three of the data lines D1 to Dm.

Each single-color pixel (e.g., red pixel 101-R) includes a thin film transistor (TFT) T and a liquid crystal capacitor Clc. Preferably, each single-color pixel 101 further includes a storage capacitor Cst. As shown in FIG. 2, a gate terminal of the TFT T is connected to a corresponding gate line Gj, and a source terminal of the TFT T is connected to a corresponding data line Dk. A drain terminal of the TFT T is connected to a first electrode of the liquid crystal capacitor Clc and a first electrode of the storage capacitor Cst. Preferably, a second electrode of the storage capacitor Cst is connected to the storage line SL. A common voltage Vcom is applied to a second electrode of the liquid crystal capacitor Clc.

Each touch sensor 102 includes first and second switch S1 and S2, a reference capacitor Cr and a sensor capacitor Cts. As shown in FIG. 2, the first switch S1 is connected to the associated touch line TLi and a first node N. The second switch S2 is connected to the storage line SL and the first node N. The first switch S1 is turned on or off by the gate line Gj-1, and the second switch S2 is turned on or off by the gate line Gj next to the gate line Gj-1. The reference capacitor Cr is connected to the storage line SL and the first node N. A first electrode of the sensor capacitor Cts is connected to the first node N, and the common voltage Vcom is applied to a second electrode of the sensor capacitor Cts. Here, the first and second switches S1 and S2 are preferably TFTs. Preferably, the sensor capacitor Cts is a variable capacitor.

In addition, as shown in FIGS. 10 to 12, the TSP 100 includes upper and lower substrates 2000 and 1000 with the aforementioned components formed thereon, and liquid crystals 3000 interposed between the upper and lower substrates 2000 and 1000.

The gate lines G1 to Gn, the data lines D1 to Dm, the storage lines SL, the TFTs T, the storage capacitors Cst, the first and second switches S1 and S2, and the reference capacitors Cr are formed on the lower substrate 1000. Electrodes of the liquid crystal capacitors Clc and the sensor capacitor Cts are also formed on the lower substrate 1000.

Each TFT T includes a gate electrode 111, a source electrode 114 and a drain electrode 115. A gate insulating layer 112 and an active layer 113 are positioned, respectively, between the gate electrode 111 and the source electrode 114, and between, the gate electrode 111, and the drain electrode 115. The gate insulating layer 112 is a dielectric layer for the storage and reference capacitors Cst and Cr. The active layer 113 may be formed below the data lines D1 to Dm.

Preferably, a portion of the storage line SL protrudes in the shape of a plate within a pixel region to be used as a first electrode of the storage capacitor Cst, as shown in FIG. 10. Further, another portion of the storage line SL preferably protrudes in the shape of a plate within a touch sensor region to be used as a first electrode of the reference capacitor Cr. A passivation layer 116 and a protective layer 117 are formed on the TFTs T and the data lines D1 to Dm.

In addition, a first electrode of the liquid crystal capacitor Clc and a pixel electrode 118, used as the second electrode of the storage capacitor Cst, are positioned on the protective layer 117 in the pixel region. Here, an extended portion of the drain electrode connected to the pixel electrode 118 through a contact hole is positioned between the pixel electrode 118 and the first electrode of the storage capacitor Cst,thereby increasing the capacitance of the storage capacitor Cst. A transparent electrode 119 is used to provide the first electrode of the sensor capacitor Cts and the second electrode of the reference capacitor Cr is positioned on the protective layer 117 in the touch sensor region.

A light shielding pattern 121 (e.g., a black matrix), a color filter 122, and a common electrode 124 for the other electrodes of the liquid crystal and sensor capacitors Clc and Cts are formed on the upper substrate 2000. The color filter 122 includes red, green and blue filters. An overcoat layer 123 may be positioned on the light shielding pattern 121 and the color filter 122. The liquid crystals 3000 are interposed between the upper and lower substrates 2000 and 1000. The liquid crystal layer 3000 provides a dielectric material for the liquid crystal and sensor capacitors Clc and Cts.

The pixel electrode 118 may be formed with protrusion or cutout patterns that serve as a domain divider for controlling the alignment directions of molecules in the liquid crystal layer 3000. The protrusion or cutout patterns may also be formed in the common electrode 124. Preferably, the liquid crystal layer 3000 of this embodiment are aligned vertically.

It has been described above that the second switch S2 of the touch sensor 102 and the reference capacitor Cr are connected to the storage line SL. In this case, the storage line SL is electrically isolated from the common electrode 124 in the upper substrate 2000. A voltage applied to the common electrode 124 is preferably different from that applied to the storage line SL. However, the present invention is not limited thereto. That is, the TSP 100 may further include an additional reference voltage line RL to which the second switch S2 and the reference capacitor Cr are connected, such as shown in FIG. 3. Preferably, the common electrode 124 is electrically connected to the storage line SL.

A control module including the gate driver 200, the data driver 300, the driving voltage generator 400, the signal controller 500 and the touch sensing unit 600 is provided outside of the aforementioned TSP 100.

The control module supplies driving signals to the TSP 100, so that the TSP 100 receives light from an external light source (e.g., a backlight) for image display. The control module also detects a position in a region of the TSP 100 that is touched by a user. The control module may be provided as one or more IC chips and electrically connected to the TSP 100. Some of the components of the control module may be integrated into the TSP 100. The components of the control module are next described.

First, the signal controller 500 receives image signals R, G and B and an image control signal CS from an external graphic controller (not shown). The image signals R, G and B include the primary pixel data (i.e., red, green and blue data). The image control signal CS includes a vertical synchronization signal Vsync, a horizontal synchronization signal Hsync, a main clock signal CLK, and a data enable signal DE. The signal controller 500 converts, when necessary, the image signals R, G and B into a form suitable for operating the display panel 100.

The signal controller 500 generates control signals, including gate and data control signals. For example, the signal controller 500 transmits a vertical synchronization start signal STV to the gate driver 200 and transmits the data control signal Dctrl to the data driver 300. The data control signal Dctrl includes a horizontal synchronization start signal for indicating transmission start of a pixel data signal, a load signal for applying a data voltage to a corresponding data line, and a data clock signal. The data control signal Dctrl may further include an inversion signal for inverting the polarity of a gradation voltage with respect to a common voltage. The signal controller 500 may also provide a gate clock signal Gclk to the gate driver 200.

The voltage generator 400 generates a variety of driving voltages required for driving the touch screen apparatus using an external power voltage Vcc. For example, the voltage generator 400 generates a reference voltage AVDD, a gate turn-on voltage Von, a gate turn-off voltage Voff, a sensing reference voltage Vref, and a common voltage Vcom. The voltage generator 400 applies the gate turn-on voltage Von and the gate turn-off voltage Voff to the gate driver 200 and applies the reference voltage AVDD to the data driver 300. The voltage generator 400 also provides the sensing reference voltage Vref to the storage line SL in the TSP 100 and the common voltage Vcom to the common electrode 124 in the TSP 100.

In this exemplary embodiment, a voltage of 5 to 25V is used as the gate turn-on voltage Von and a voltage of −5 to −25V is used as the gate turn-off voltage Voff. A voltage of −1 to −10V is preferably used as the sensing reference voltage Vref, and a voltage of 0 to 5V is preferably used as the common voltage Vcom.

The data driver 300 generates a gradation signal using the data control signal Dctrl and the pixel data signal from the signal controller 500 and the reference voltage AVDD from the voltage generator 400, and applies the gradation signal to the respective data lines D1 to Dm. That is, the data driver 300 is driven according to the data control signal Dctrl to convert an input digital pixel data signal into an analog gradation signal using the reference voltage AVDD. The data driver 300 supplies the converted gradation data signal to the plurality of data lines D1 to Dm.

The gate driver 200 applies the gate turn-on voltage Von and the gate turn-off voltage Voff to the gate lines G1 to Gn according to the vertical synchronization start signal STV. The gate turn-on voltage Von is sequentially provided to all the gate lines G1 to Gn during one frame.

The touch sensing unit 600 includes sensing readers 610-1 to 610-o respectively connected to the touch lines TL1 to TLo. Each of the sensing readers 610-1 to 610-o senses a change in the amount of charge in the connected touch line TL1 to TLo to output a vertical coordinate signal.

Each of the sensing readers 610-1 to 610-o includes an integration circuit 611. Each of the sensing readers 610-1 to 610-o further includes an amplifier 612 for amplifying an output of the integration circuit 611 and an analog-to-digital converter 613 for converting an output of the amplifier 612. Here, an integration circuit using an operational amplifier OP1 is used to implement the integration circuit unit 611. That is, the integration circuit 611 includes an operational amplifier OP 1 having an inversion input terminal (−) connected to the corresponding one of the touch lines TL1 to Tlo and a non-inversion input terminal (+) connected to a ground power source GND, and an output capacitor Co connected to an output terminal and the inversion input terminal (−) of the operational amplifier OP1.

Here, a coordinate calculator (not shown) may be further provided to calculate coordinates of a touch region using the vertical coordinate signals of the touch sensing unit 600. Horizontal coordinate signals are preferably provided to the coordinate calculator through the gate driver 200. The touch sensors 102, which may be fewer or equal in number than the gate lines G1 to Gn, are each connected to one of the touch lines TL1 to TLo. Touch sensors 102, operated by the gate lines G1 to Gn, output signals indicating the presence or the absence of a touch to associated touch lines TL1 to TLo. That is, the touch sensor 102 provides an amount of charge Qread, which is affected by a user's touch, to the associated touch line TL1 to TLo.

The sensing reader 610-1 to 610-o receives a signal provided to the corresponding one of the touch lines TL1 to TLo by the touch sensors 102 and then outputs a vertical coordinate signal. Thus, when a voltage level of the vertical coordinate signal is changed, the coordinate of the corresponding the gate line G1 to Gn to which a gate turn-on voltage is applied at that time becomes a horizontal coordinate signal. For example, the TSP 100 may have 100 gate lines and 100 touch lines. If sensing reader connected to the twentieth touch line outputs a changed vertical coordinate signal when a gate turn-on voltage is applied to the thirtieth gate line, the X and Y coordinates are 30 and 20, respectively. That is, the position of the touch is determined to be the point where the thirtieth gate line and the twentieth touch line intersect each other.

As described above, since a horizontal coordinate can be obtained through the gate lines G1 to Gn in the TSP 100 of this embodiment, additional lines for obtaining the horizontal coordinate is not necessary. However, the present invention is not so limited; the TSP 100 may further include additional lines for obtaining a horizontal coordinate.

In the exemplary embodiment, the capacitance of the sensor capacitor Cts in the touch sensor 102 is changed by the force applied to the TSP 100 when a user touches the TSP 100. The difference in capacitance is sensed by the touch sensing unit 600 positioned outside of the TSP 100, to obtain a horizontal coordinate of a touch region.

The technical principle and operation of the sensing readers 610-1 to 610-o and the touch sensors 102 is described with reference to FIGS. 2 to 7. The following description focuses on the charge amount. FIGS. 4 to 7 are circuit diagrams illustrating the operational principle of the touch sensor 102 in FIG. 2.

As described above, each touch sensor 102 includes the first and second switches S1 and S2, the sensor capacitor Cts, and the reference capacitor Cr. The reference capacitor Cr is connected to the reference voltage input portion (i.e., the storage line SL) and the first node N. The sensor capacitor Cts is connected to the first node N and the common voltage input portion (i.e., the common electrode 124 ). That is, the reference capacitor Cr is connected in series to the sensor capacitor Cts. The first switch S1 is connected to the first node N and the i-th touch line TLi. Further, the first switch S1 is turned on or off by the signal of the (j-1)-th gate line Gj-1. The second switch S2 is connected to the first node N and the sensing reference voltage input portion (i.e., the storage line SL). Further, the second switch S2 is turned on or off by a signal of the j-th gate line Gj. The reference capacitor Cr and the second switch S2 are connected in parallel to the first node N and the storage line SL.

The operation of the touch sensor 102 with the aforementioned configuration is as follows.

Figure 4:
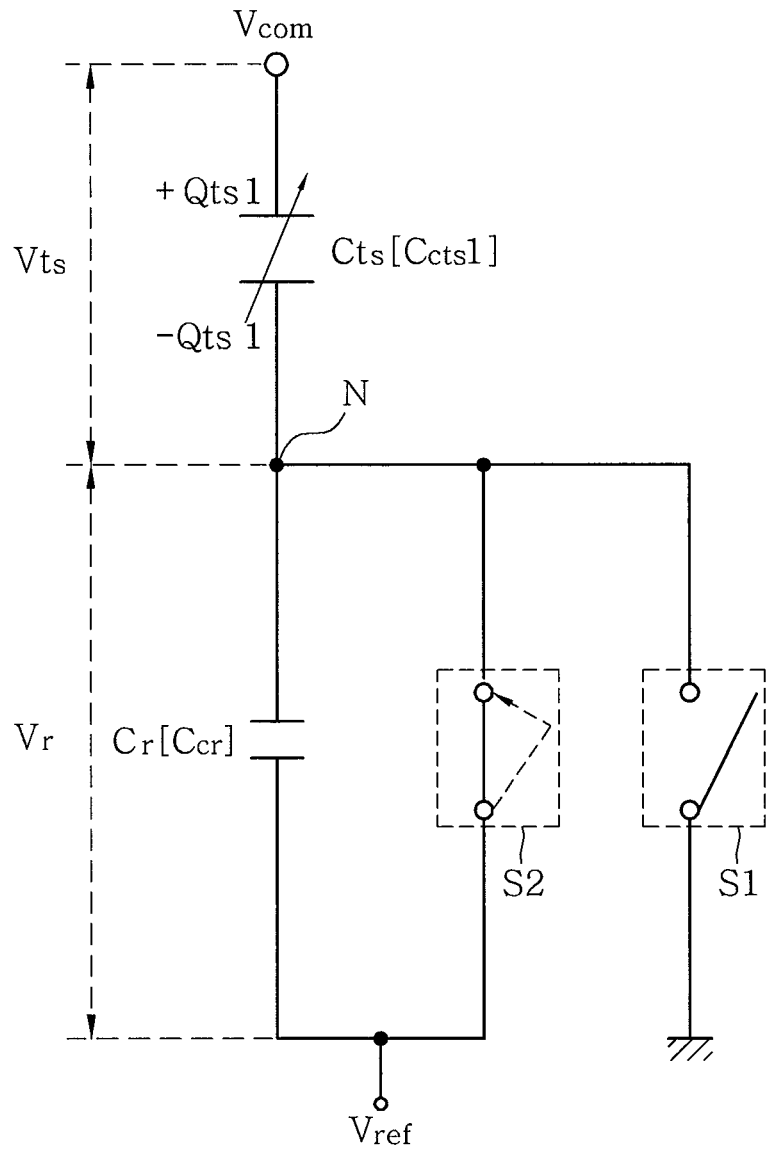
FIGS. 4 to 7 are conceptual illustrations of the operation of the touch sensor according to the first exemplary embodiment of the present invention.
Figure 5:
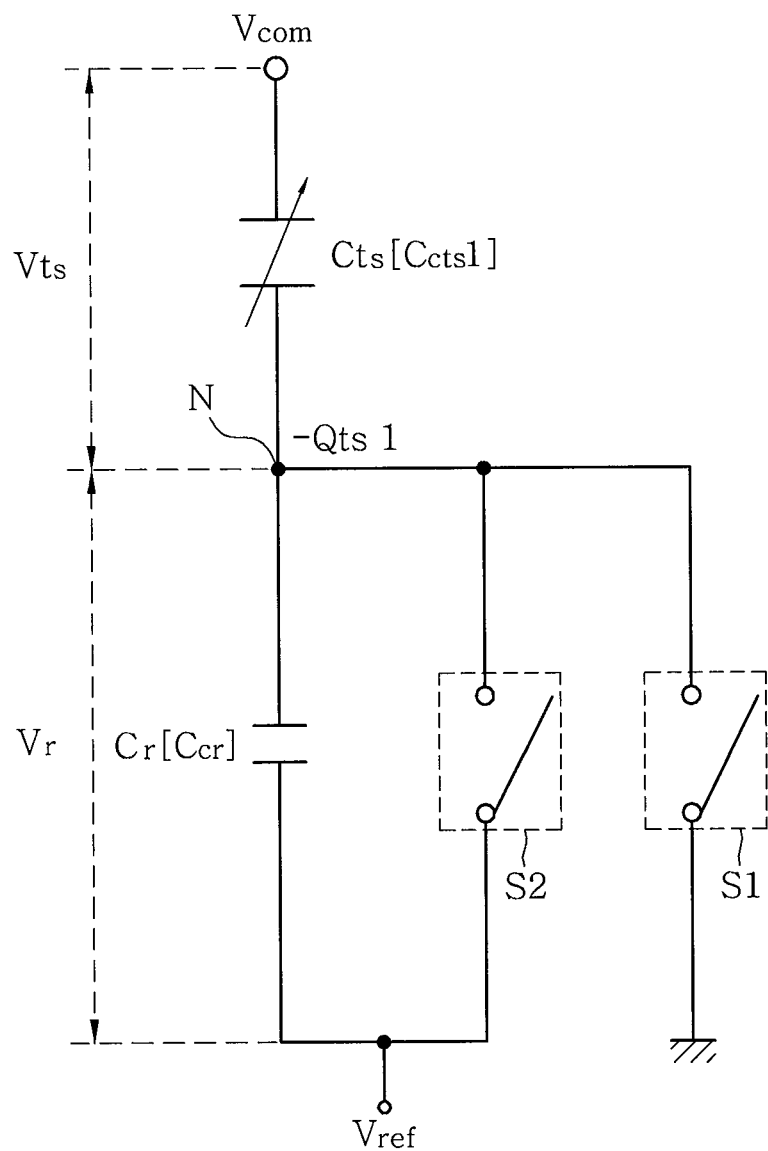
Figure 6:
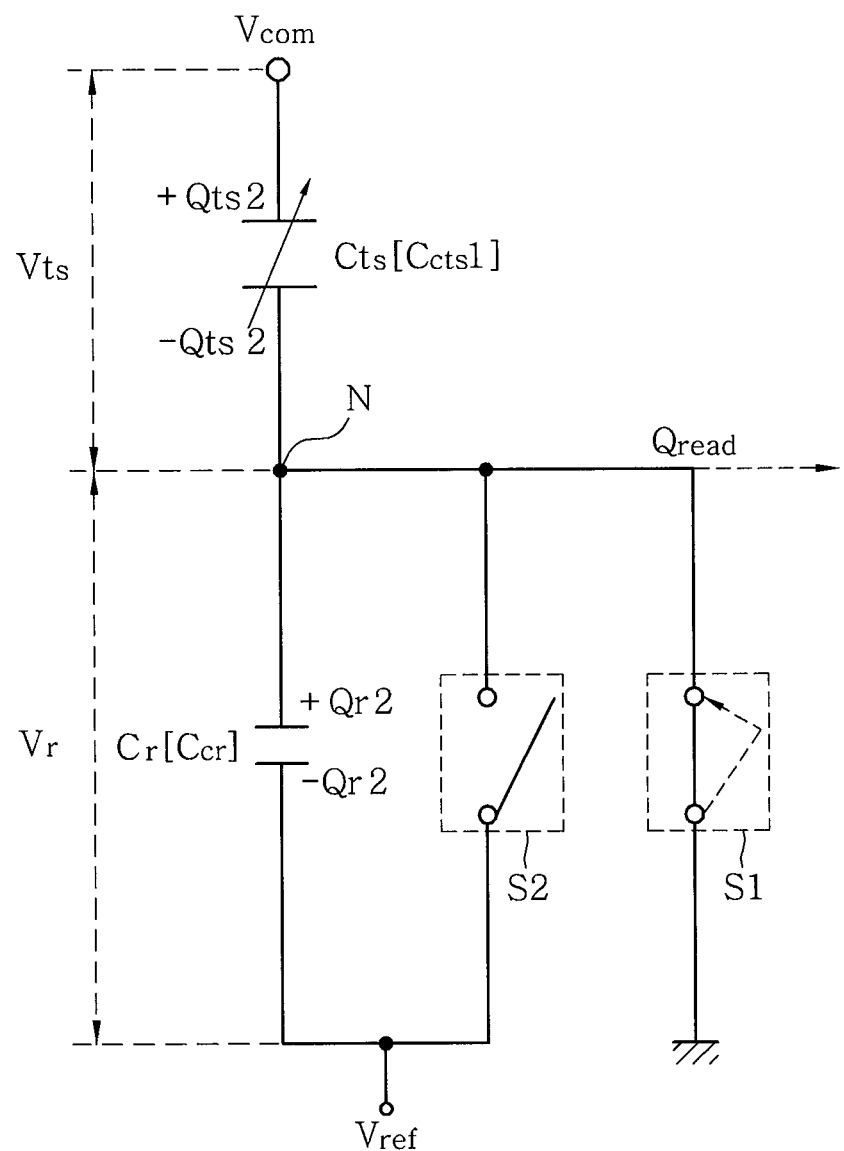

When power is first applied to the TSP 100, both the first and second switches S1 and S2 are turned off, as shown in FIG. 5. Subsequently, as shown in FIG. 6, the first switch S1 is turned on by a gate turn-on voltage Von applied to the (j-1)-th gate line Gj-1, and the second switch S2 is turned off. The first node N has a charge amount Qread held in a null state. Hence, the j-th sensing reader outputs a value corresponding to the null state due to the charge amount Qread. Subsequently, as shown in FIG. 4, the first switch S1 is turned off, and the second switch S2 is turned on by a gate turn-on voltage Von applied to the j-th gate line Gj, giving the first node N the sensing reference voltage Vref.

The present invention is not limited by the aforementioned order of operating the switches. The order but may vary depending on the position of the touch sensor 102. That is, although the switches operate in the order of FIGS. 5, 6 and 4 in the aforementioned description, the switches may operate in the order of FIGS. 6, 4 and 5.

Here, assuming that the voltage difference between the two ends of the sensor capacitor Cts is Vts, the Vts is expressed by the following Equation 1.

$$Vts = Vcom - Vref \tag{1}$$

A voltage which equals the difference between the reference voltage Vref and the common voltage Vcom is applied to both ends of the sensor capacitor Cts. As shown in FIG. 4, a charge amount of +Qts1 is charged into the one electrode of the sensor capacitor Cts to which the common voltage Vcom is applied, and a charge amount of -Qts1 is charged into the other electrode of the sensor capacitor Cts connected to the first node N.

As described above, the output value (i.e., the output charge amount Qread) of the touch sensor 102 while the power is applied, i.e., during a first frame, becomes null. Then, the first node N of the touch sensor 102 is charged with a charge amount of -Qts1.

The operation of the touch sensor 102 in frames after the first frame is described below.

In FIG. 5, where both the first and second switches are turned off, the sensor capacitor Cts and the reference capacitor Cr are connected in series to the reference voltage Vref and the common voltage Vcom. The first node N maintains the charge amount of -Qts1, which was previously charged.

The charge amount of -Qts1 charged into the first node N is expressed by the following Equation 2.

$$Qts1 = (Vcom - Vref) \times Ccts1 \tag{2}$$

The Qst1 has a value that equals to multiplying the difference in voltage across the two ends of the sensor capacitor Cts by the capacitance Ccts1 of the sensor capacitor Cts. Here, the capacitance of the sensor capacitor Cts has a value of Ccts1 in the absence of a touch. In this embodiment, the capacitance of the sensor capacitor Cts is referred to as "Ccts." The capacitance of the sensor capacitor Cts in the absence of a touch is referred to as "Ccts1", and the capacitance of the sensor capacitor Cts when a touch action is made is referred to as "Ccts2".

If the gate turn-on voltage Von is applied to the (j-1)-th gate line Gj-1, subsequently, the first switch S1 is turned on as shown in FIG. 6. At this time, the second switch S2 is turned off. The first node N is connected to the corresponding touch line TLi.

In this case, the charge amount Qread output to the touch line TLi is expressed by the following Equation 3.

$$-Qts1 = Qread - Qts2 + Qr2$$

$$Qread = Qts2 - Qts1 - Qr2 \tag{3}$$

The charge amount (Qread-Qts2+Qr2) of the first node N in a state where only the first switch S1 is turned on is the same as that (-Qst1) in the previous state, i.e., in a state where both the first and second switches S1 and S2 are turned on.

In this state, Qts2 and Qr2 are expressed by the following Equation 4.

$$Qts2 = Vcom \times Ccts1$$

$$Qr2 = -Vref \times Ccr \tag{4}$$

When the common voltage Vcom is applied to both ends of the sensor capacitor Cts, the charge amount Qts2 of the sensor capacitor Cts equals to multiplying the voltage Vcom applied across the sensor capacitor Cts by the capacitance Ccts1 of the sensor capacitor Cts. When the reference voltage Vref is applied across the reference capacitor Cr, the charge amount Qr 2 of the reference capacitor Cr equals to multiplying the voltage Vref applied across the reference capacitor Cr by the capacitance Ccr of the reference capacitor Cr.

The charge amount Qread is provided by the following Equation 5.

$$Vout = -\frac{1}{Cco} \int Iread \, dt = -\frac{Qread}{Cco} \tag{5}$$

$$Qread = -Vout \times Cco$$

Vout, an output voltage, is an output voltage of the operational amplifier OP1 as shown in FIG. 2. Cco is a capacitance of the output capacitor Co. Thus, the output voltage Vout of the integration circuit 611 is obtained by dividing the output charge amount Qread of the touch lines TL1 to TLo by the capacitance Cco of the output capacitor Co. That is, the integral of current Iread in the touch line TLi is the output charge amount Qread. Here, the output charge amount Qread of the touch line TLi is a charge amount supplied to the inversion terminal (−) of the integration circuit 611. The charge amount Qread of the touch line TLi may be a charge amount charged into one electrode of the output capacitor Co. The charge amount charged into the one electrode of the output capacitor Co, i.e., the output charge amount Qread, is obtained by multiplying the output voltage Vout of the integration circuit 611 by the capacitance Cco of the output capacitor Co.

As described above, the output voltage Vout of the integration circuit 611 varies depending on the charge amount Qread of the touch line TLi. As shown in FIG. 2, the output voltage Vout of the integration circuit unit 611 is amplified by the amplifier 612, and the amplified value is converted into a digital output value.

If Equation 3 is reformulated on the basis of Equations 2, 4 and 5, it is expressed by the following Equation 6.

$$Qread = Qts2 - Qts1 - Qr2 \quad (6)$$
$$-Vout \times Cco =$$
$$Vcom \times Ccts1 - (Vcom - Vref) \times Ccts1 + Vref \times Ccr$$
$$Vout = -\frac{Vref(Ccts1 + Ccr)}{Cco}$$

In Equation 6, the sensor reference voltage Vref, the capacitance Ccr of the reference capacitor Cr and the capacitance Cco of the output capacitor Co are fixed values. Thus, the output of the integration circuit unit 611 is proportional to the capacitance Ccts1 of the sensor capacitor Cts of the touch sensor 102 as described in Equation 6.

In this embodiment, the capacitance Ccts of the sensor capacitor Cts of the touch sensor 102 is changed in the region of the TSP 100, where when, the upper substrate 2000 is pressed by the force applied by the touch. The applied force reduces the distance between the two electrodes of the sensor capacitor Cts in the sensor region, thereby changing the capacitance Ccts of the sensor capacitor Cts. As described in Equation 6, the output voltage Vout of the integration circuit 611 is changed as a result of the change in capacitance Ccts.

Figure 7:
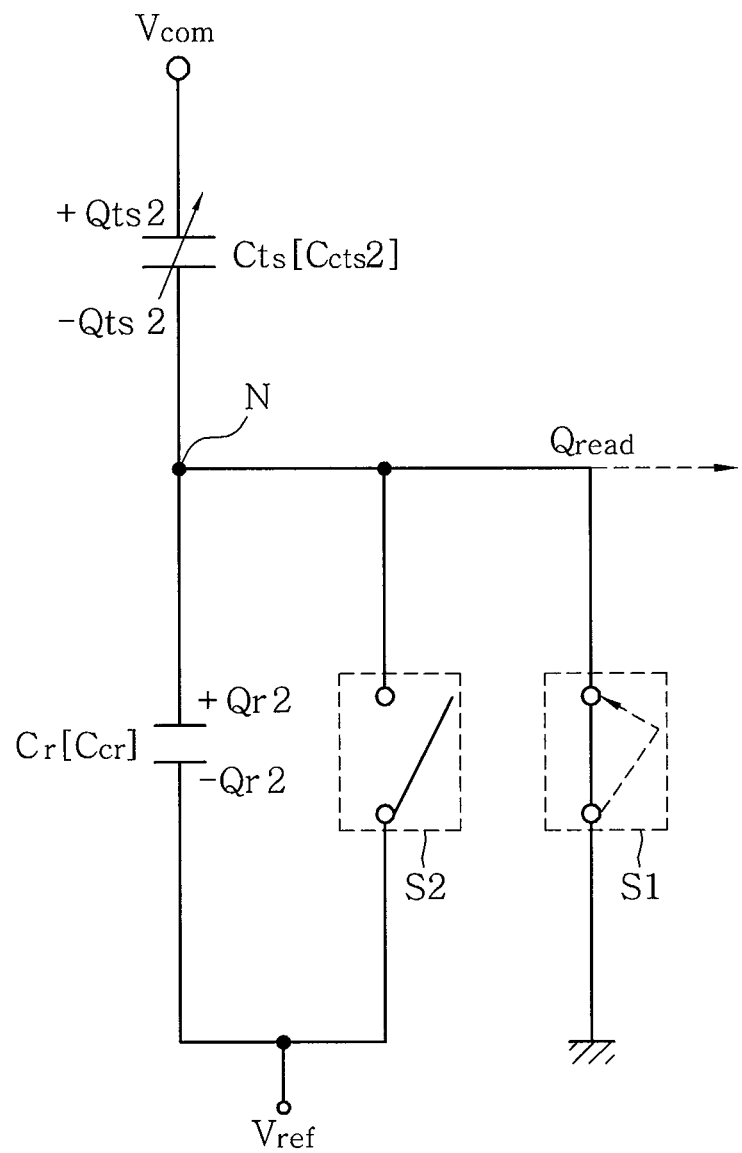

A change in the capacitance Ccts of the sensor capacitor Cts is illustrated in FIG. 7. In FIG. 7, the capacitance of the sensor capacitor increases from Ccts1 to Ccts2 due to the user's pressure.

The case where a user touches the TSP 100 is described below.

When the user touches a region of the TSP 100, the capacitance Ccts of the sensor capacitor Cts of the touch sensor 102 increases in the corresponding region, as described above. However, as shown in FIG. 5, the charge amount of the first node N is the value Qts1 of the previous frame until the first switch S1 is turned on. As shown in FIG. 7, the charge amount of the first node N changes, when the first switch S1 is turned on, because the capacitance Ccts of the sensor capacitor Cts is changed. That is, Qts2 in Equation 4 is changed.

In this state, Qts2 is expressed by the following Equation 7.

$$Qts2 = Vcom \times Ccts2 \quad (7)$$

As described in Equation 7, a charge amount charged into one electrode of the sensor capacitor changes when the capacitance of the sensor capacitor changes.

If Equation 6 is reformulated by substituting Equation 7 for Equation 4, Qread and Vout are expressed by the following Equation 8.

$$Qread = Qts2 - Qts1 - Qr2 \quad (8)$$
$$-Vout \times Cco =$$
$$Vcom \times Ccts1 - (Vcom - Vref) \times Ccts1 + Vref \times Ccr$$
$$Vout = -\frac{Vref(Ccts1 + Ccr) + Vcom \times (Ccts2 - Ccts1)}{Cco}$$

As a result of the user's touch, the output voltage Vout of the integration circuit 611 is proportional to the capacitance Ccts of the sensor capacitor Cts. This is because the sensing reference voltage Vref, the common voltage Vcom, the capacitance Ccr of the reference capacitor Cr, and the capacitance Cro of the output capacitor Co have fixed values in Equation 8. Such a change in the output voltage Vout of the integration circuit 611 is sensed by an external circuit, so that it can be determined that the touch action has been made by the user.

When the user continuously touches the touch region, Qts1 in Equation 2 changes because the capacitance of the sensor capacitor Cts changes. That is, the charge amount charged into the first node N changes in FIGS. 4 and 5.

At this time, Qts1 is expressed by the following Equation 9.

$$Qts1 = (Vcom - Vref) \times Ccts2 \quad (9)$$

If Equation 8 is reformulated by substituting Equation 9 for Equation 4, it is expressed by the following Equation 10.

$$Qread = Qts2 - Qts1 - Qr2 \quad (10)$$
$$-Vout \times Cco =$$
$$Vcom \times Ccts2 - (Vcom - Vref) \times Ccts2 + Vref \times Ccr$$
$$Vout = -\frac{Vref(Ccts2 + Ccr)}{Cco}$$

As described in Equation 10, the output voltage Vout of the integration circuit 611 changes with the change in the capacitance Ccts2 of the sensor capacitor Cts. Thus, when the user continuously touches the touch region, the output voltage Vout of the integration circuit 611 changes with the change in the capacitance Ccts2 of the sensor capacitor Cts.

In this embodiment, the capacitance Ccts of the sensor capacitor Cts of the touch sensor 102 in the touch region changes. That is, the charge amount of the first node N in the touch sensor 102 changes. The voltage level of the output voltage Vout of the integration circuit 611 changes according the charge amount of the first node N. The coordinate of the touch region can be calculated as described above by sensing a change in the output voltage Vout of the integration circuit unit 611.

As described above, when a user touches the TSP 100, the cell gap between the upper and lower substrates 2000 and 1000 in the TSP 100 is changed by the force applied. The output voltage Vout of the integration circuit 611 changes according to the distance between the two electrodes of the sensor capacitor Cts.

FIG. 9 is a graph showing simulation results of an output voltage of the integration circuit changes relative to the width of the cell gap of the touch screen panel according to the first embodiment of the present invention. The following Table 1 shows the simulation results of FIG. 9. In this simulation, the common voltage is 3V, and the capacitance Cco of the output capacitor Co is 1 pF.

TABLE 1

| | Cell gap (μm) | | | | | | |
|---|---|---|---|---|---|---|---|
| | 0.6 | 0.5 | 0.4 | 0.3 | 0.2 | 0.1 | 0.05 |
| Capacitance (pF) of sensor capacitor | 0.08 | 0.10 | 0.12 | 0.16 | 0.24 | 0.48 | 0.95 |
| Capacitance (pF) of reference capacitor | 0.04 | 0.04 | 0.04 | 0.04 | 0.04 | 0.04 | 0.04 |
| Output voltage (V) of integration circuit unit | 0.34 | 0.39 | 0.46 | 0.58 | 0.82 | 1.53 | 2.96 |

As shown in Table 1 and FIG. 9, when the cell gap in the TSP 100 is 0.6 cm, the output voltage Vout of the integration circuit 611 is 0.34V. However, when the cell gap in the TSP 100 is reduced as 0.1 μm by a user's touch action, the output voltage Vout of the integration circuit 611 is 1.53V.

In FIG. 9, Line X shows results based on the operation of the TSP 100 according to this embodiment, and Line Z shows results corresponding to a conventional resistance-type TSP.

As shown in Line Z of FIG. 9, only when the cell gap of the resistance-type TSP is 0 μm, i.e., when the upper and lower substrates 2000 and 1000 come into contact with each other, the output voltage of the resistance-type TSP is changed. However, since the TSP 100 of this embodiment outputs different voltages depending on a cell gap as shown in Line X of FIG. 9, the sensitivity of the TSP 100 can be adjusted. Because the range of the output voltage Vout varies with the cell gap, it is possible to sufficiently secure a process margin for manufacturing the TSP 100 of this embodiment. For example, since various levels of the output voltage Vout result from the various cell gaps, a process margin for the cell gap can be sufficiently secured. Furthermore, the presence of a touch action can be determined without a contact between the upper and lower substrates. Accordingly, when a TSP 100 is used for an extended period of time, it is possible to prevent malfunction of the TSP due to the collapse of a spacer which maintains the cell gap.

Hereinafter, the operation of an exemplary embodiment of TSP 100 is described with reference to the waveform diagram of FIG. 8.

In the TSP 100 of this embodiment, a moving image is expressed by frames Fr−1, Fr and Fr+1. The gate turn-on voltage Von is sequentially applied to the gate lines G1 to Gn during each frame.

First, the basic operation of the TSP 100 is described as follows.

The gate turn-on voltage Von is applied to the (j−1)-th gate line Gj-1 of FIG. 2, and the gate turn-on voltage Von is then applied to the j-th gate line Gj. The gate turn-on voltage Von is first applied to the pixel 101 and the touch sensor 102 connected to the (j−1)-th gate line Gj-1, providing image data for an image to the pixel 101 connected to the (j−1)-th gate line Gj-1. The touch sensor 102 connected to the (j−1)-th gate line Gj-1 provides a signal (touch action) for sensing a touch action to the corresponding touch line TL1 to TLo. The level of the signal for sensing a touch action changes depending on the change in the charge amount in the first node N of the touch sensor 102. The sensing readers 610-1 to 610-o in the touch sensing unit 600 output an output voltage according to the signal for sensing a touch action in the touch lines TL1 to TLo. The output voltage is changes with the level of the touch sensing signal.

The pixel and the touch sensor connected to the j-th gate line Gj also perform the same operation. When the gate turn-on voltage Von is applied to the j-th gate line Gj, the first node N of the touch sensor 102 connected to the previous stage, i.e., the (j−1)-th gate line Gj-1 is reset.

The three consecutive frames Fr−1, Fr and Fr+1, where user's touch action occurs during the r-th and (r+1)-th frames Fr and Fr+1, are illustrated in FIG. 8.

First, in the (r−1)-th frame, in the absence of a touch action, the output voltage Vout of the sensing reader 610-i does not change although the gate turn-on voltage is applied to the (j−1)-th gate line Gj-1. The sensing reader 610-i outputs an output voltage Vout of a first level.

Subsequently, when the user's touch action occurs in the r-th frame Fr, the capacitance Ccts of the sensor capacitor Cts in the corresponding touch sensor 102 connected to the (j−1)-th gate line Gj-1 changes. Then, if the gate turn-on voltage Von is applied to the (j−1)-th gate line Gj-1, the corresponding sensing reader 610-i outputs an output voltage Vout of a second value as shown in FIG. 8. The output voltage of the second level is generated only when the gate turn-on voltage Von is applied to the (j−1)-th gate line Gj-1. Preferably, the output voltage of the second level has a voltage level higher than the output voltage of the first level.

Then, if a gate turn-on voltage Von is applied to the j-th gate line Gj, the touch sensor 102 connected to the previous gate line Gj-1 is reset and the first node N, the electric charge of which is discharged into the sensing reader 610-1, is charged. Through the electrical charging, the presence of a touch action can be determined in the subsequent frame Fr+1.

In the (r+1)-th frame $F_{r+1}$, the user's touch-action continues. That is, the capacitance Ccts of the sensor capacitor Cts in the touch sensor 102 connected to the (j−1)-th gate line Gj-1 maintains its changed state. Thus, if the gate turn-on voltage Von is applied to the (j−1)-th gate line Gj-1, the sensing reader 610-i outputs an output voltage of a third level as shown in FIG. 8. The output voltage of the third level is generated only when the gate turn-on voltage Von is applied to the (j−1)-th gate line Gj-1. Preferably, the output voltage of the third level has a voltage level higher than the output voltage of the first level. The output voltage of the third level may have a voltage level higher or lower than the output voltage of the second level, depending on the sensing reference voltage Vref, the common voltage Vcom, the capacitance Ccr of the reference capacitor Cr, and the capacitance Cco of the output capacitor Co.

In this embodiment, while a user's touch action is performed, the sensing reader 610-i connected to the touch sensor 102 in the corresponding region outputs an output voltage of a voltage level higher than the output voltage of the first level.

As described above, the touch sensor 102 in the TSP 100 according to this embodiment of the present invention determines the presence a touch action using the electrical energy of the first node N. When a cell gap of the TSP 100 is changed by a user's touch action, the capacitance Ccts of the sensor capacitor Cts connected to the first node N changes due to the change in cell gap. The electrical energy provided to the first node N also changes due to the change in the capacitance Ccts of the sensor capacitor Cts.

In this embodiment, the presence of a touch action is determined using the electrical energy of the first node N, i.e., a change in charge amount. That is, the charge amount of the first node N changes with the capacitance Ccts of the sensor capacitor Cts. The presence of a touch action can be determined by providing the change of charge amount in the first node N to the touch lines TL1-TLo.

However, the present invention is not limited to the operation above. For example, the presence of a touch action may be determined using a change in the voltage of the first node N to control a switch. That is, the voltage of the first node N changes with the capacitance Ccts of the sensor capacitor Cts. The presence of a touch action can be determined by turning on or off a switch using the voltage of the first node N to control a sensing signal to be applied to the touch lines TL1-TLo.

Hereinafter, a touch screen apparatus according to a second embodiment of the present invention will be described. Some descriptions of the second embodiment which overlap the aforementioned descriptions will be omitted. Further, the descriptions of the second embodiment can be applied to the first embodiment.

Figure 13:
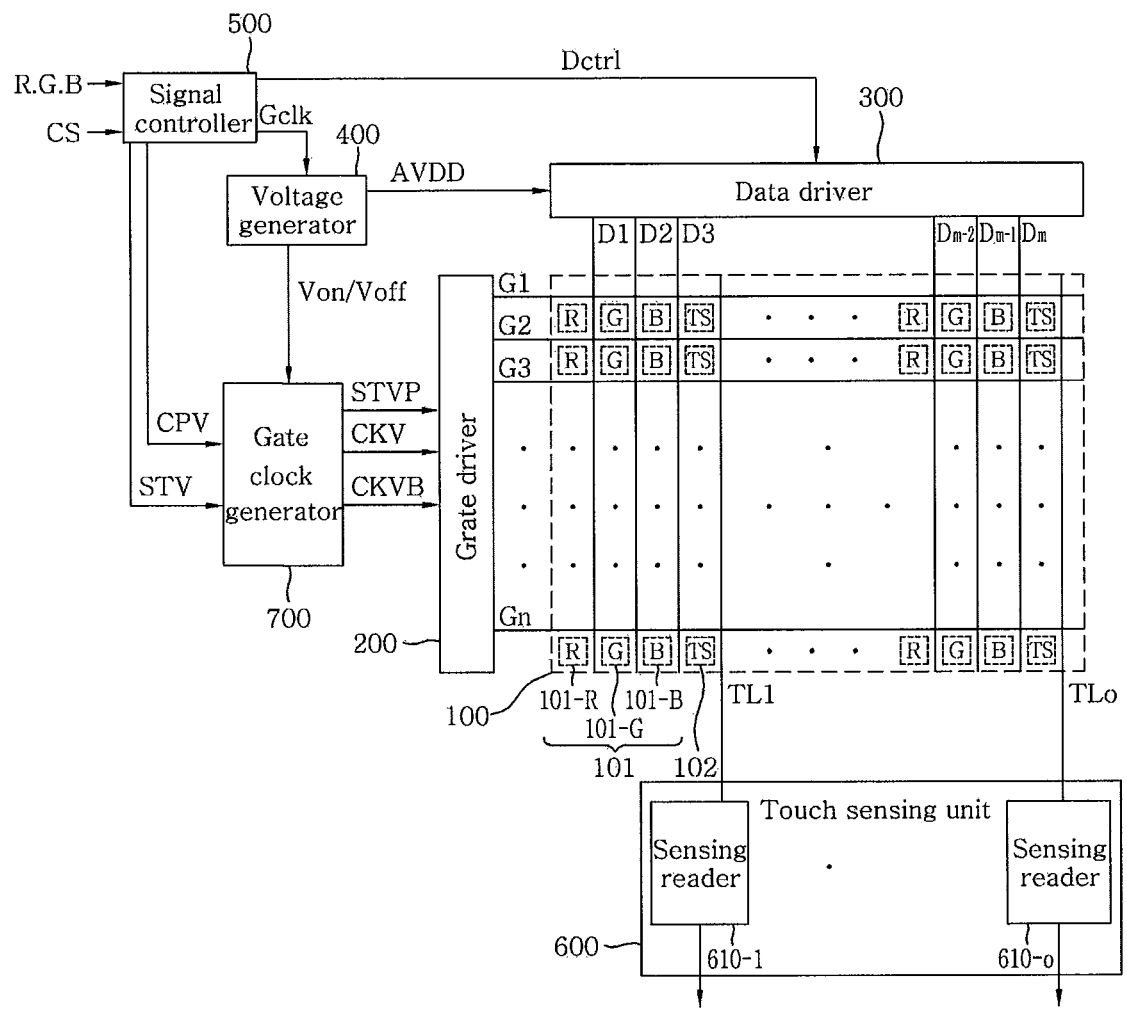
FIG. 13 is a block diagram showing a touch screen apparatus according to a second exemplary embodiment of the present invention.
Figure 14:
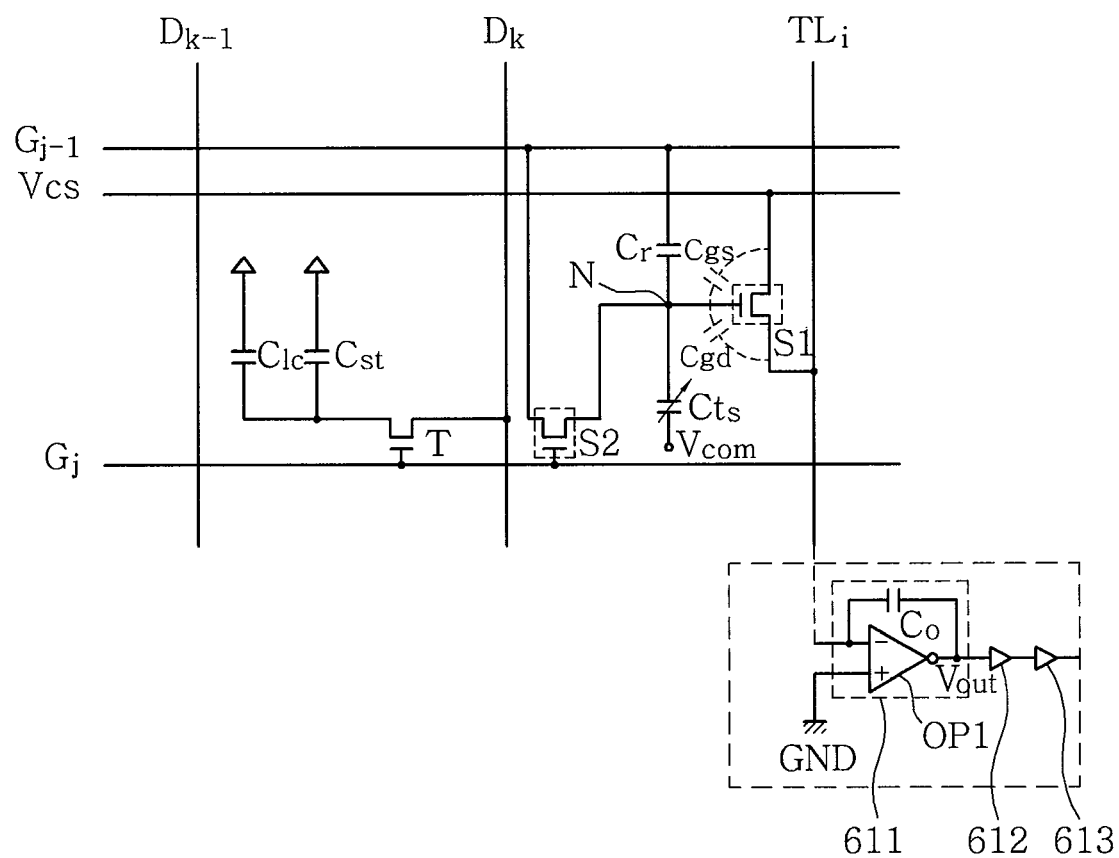
FIG. 14 is an equivalent circuit diagram showing a pixel, a touch sensor and a touch sensing unit configured according to the second exemplary embodiment of the present invention.
Figure 15:
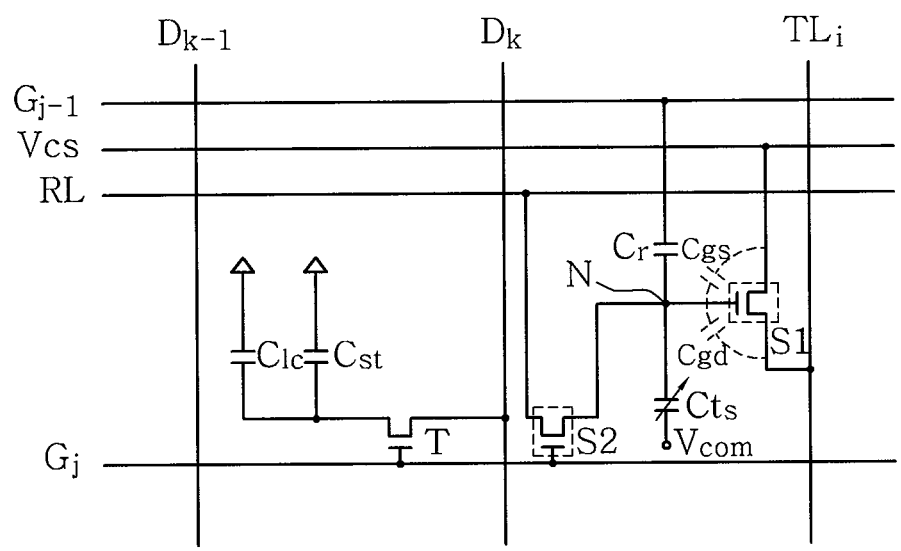
FIG. 15 is an equivalent circuit diagram showing a pixel and a touch sensor according to an alternative implementation of the second exemplary embodiment.
Figure 20:
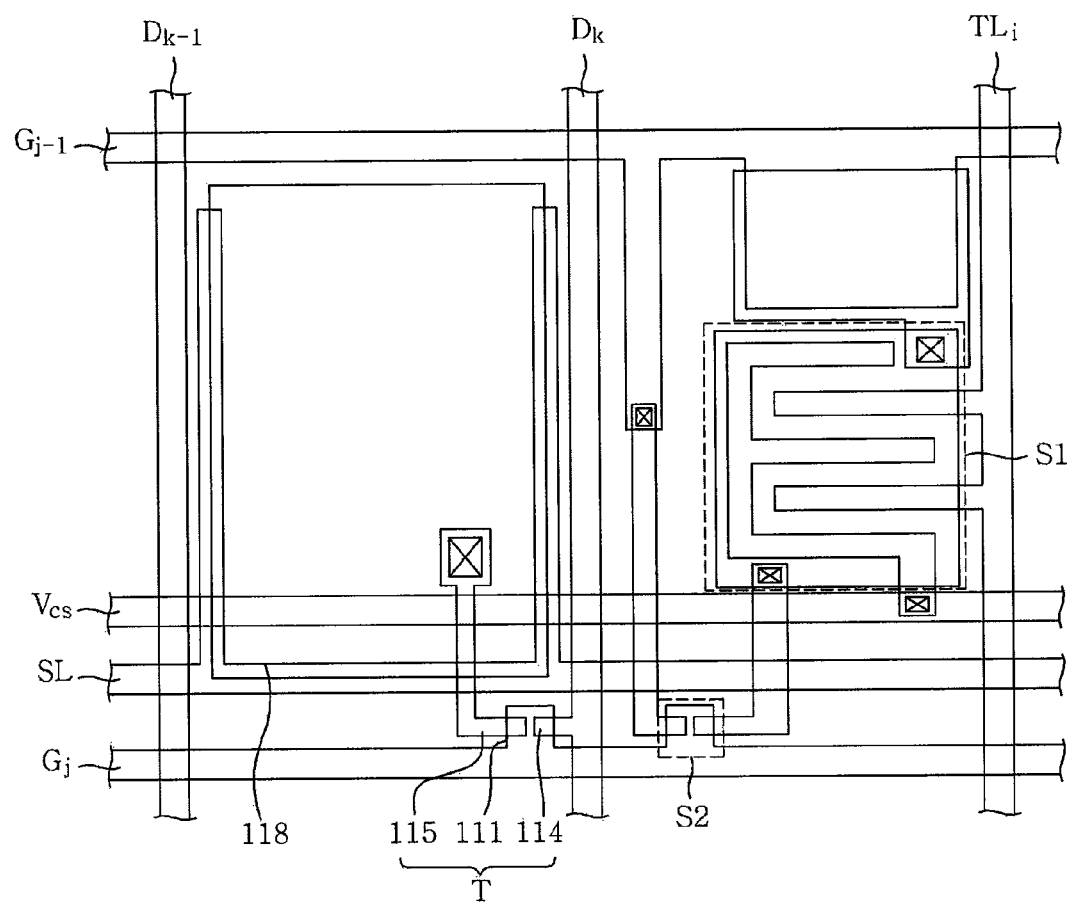
FIG. 20 is a plan view of a circuit that includes a pixel and a touch sensor region according to the second exemplary embodiment of the present invention.
Figure 21:
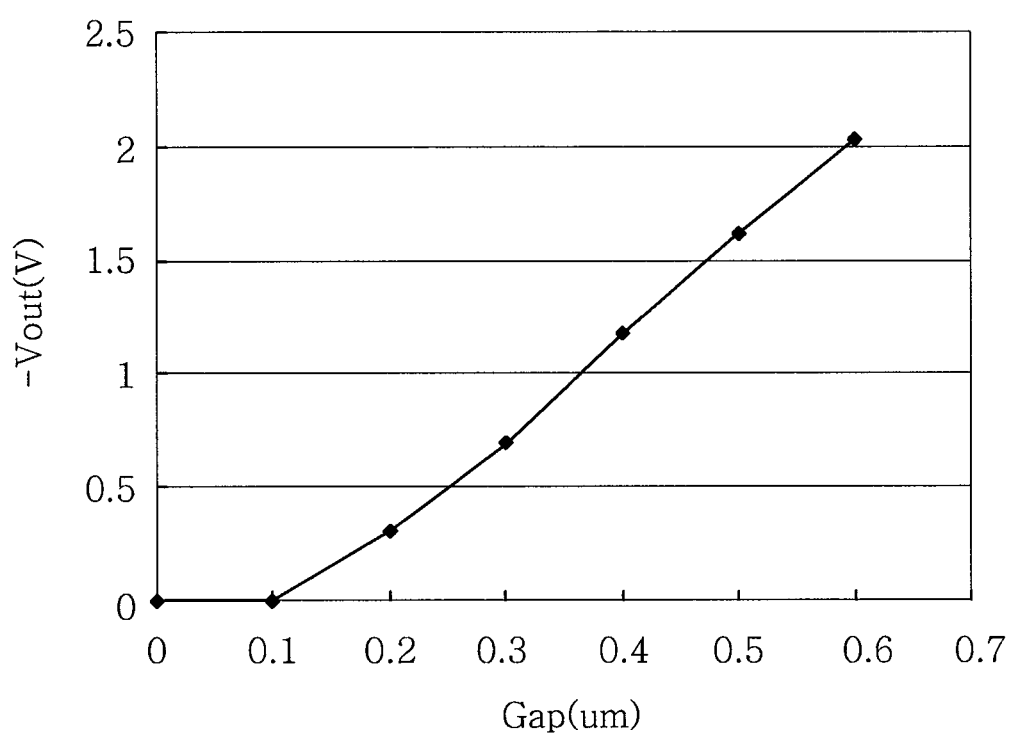
FIG. 21 is a graph based on simulation results showing output voltages of an integration circuit unit in response to various widths of the cell gap of a touch screen panel according to the second exemplary embodiment of the present invention.

FIG. 13 is a block diagram of a touch screen apparatus according to a second exemplary embodiment of the present invention. FIG. 14 is an equivalent circuit diagram of a circuit that includes a pixel, a touch sensor and a touch sensing unit according to the second exemplary embodiment of the present invention. FIG. 15 is an equivalent circuit diagram of a circuit that includes a pixel and a touch sensor according to an alternative implementation of the second exemplary embodiment. FIGS. 16 to 19 are conceptual illustrations of the operation of the touch sensors according to the second exemplary embodiment of the present invention. FIG. 20 is a plan view showing a pixel and a touch sensor region according to the second exemplary embodiment of the present invention. FIG. 21 is a graph showing simulation results of an output voltage of an integration circuit, relative to the cell gaps of a touch screen panel according to the second exemplary embodiment of the present invention.

Referring to FIGS. 13 to 20, the touch screen apparatus according to the second embodiment further includes a gate clock generator 700, which receives a first vertical synchronization start signal STV and a driving clock signal CPV from the signal controller 500 and receives a gate turn-on voltage Von and a gate turn-off voltage Voff from the driving voltage generator 400 to provide a second vertical synchronization start signal STVP, a gate clock signal CKV, and an inverse gate clock signal CKVB to the gate driver 200. Here, the gate driver 200 includes a plurality of stages (not shown). The stages are connected to the gate lines G1 to Gn, respectively. The stages sequentially provide a gate turn-on signal SVg+ to some of the gate lines G1 to Gn according to the second vertical synchronization start signal STVP, the gate clock signal CKV, the inverse gate clock signal CKVB, and the signal of the previous stage. The stages provide a gate turn-off signal SVg− to the remaining gate lines G1 to Gn to which the gate turn-on signal SVg+ is not provided.

As shown in FIG. 14, a TSP 100 of this embodiment further includes sensing voltage supply lines Vcs extending in the same direction as the gate lines G1 to Gn.

Each touch sensor 102 of this embodiment includes the first and second switches S1 and S2, the reference capacitor Cr, and the sensor capacitor Cts.

As shown in FIG. 14, the first switch S1 is connected to the corresponding touch line TLi and the sensing voltage supply line Vcs. The second switch S2 is connected to the corresponding gate line Gj-1 and the first node N. Here, the first switch S1 is turned on or off by lo the voltage of the first node N. The second switch S2 is turned on or off by the next gate line Gj. The reference capacitor Cr is connected to the corresponding gate line Gj-1 and the first node N. A first electrode of the sensor capacitor Cts is connected to the first node N, and a common voltage Vcom is applied to a second electrode of the sensor capacitor Cts. Here, TFTs are preferably used as the first and second switches S1 and S2.

The TSP 100 may further include a reference voltage line RL for providing a reference voltage as shown in the modification of FIG. 15. A voltage of the same level as the gate turn-off signal SVg− is preferably used as the reference voltage. It will be apparent that the present invention is not limited by the voltage level of the reference voltage. For example, a voltage of a level lower than the gate turn-on voltage may be used as the reference voltage. The second switch S2 is preferably connected to the reference voltage line RL and the first node N.

As shown in FIG. 20, the first and second TFTs which are respectively used as the first and second switches S1 and S2 are provided in a region of the touch sensor 102. The size of the first TFT is larger than that of the second TFT. When comparing only active regions of the first and second TFTs, the size of the active region of the first TFT is preferably 2 to 6 times larger than the active region of the second TFT. When the size of the active region of the first TFT is smaller than the aforementioned range, the first TFT may not provide sufficient current of the sensing voltage supply line Vcs to the touch line and thus may reduce the sensing capability of the TSP 100. Additionally, when the size of the active region of the first TFT is larger than the aforementioned range, the size of the second TFT may not be sufficient because the size of the region in which the touch sensor 102 is formed is predetermined. A portion of the corresponding gate line Gj-1 in the region of the touch sensor 102 protrudes form the first electrode of the sensor capacitor Cts. A portion of the corresponding gate line Gj-1 protrudes to be connected to a source terminal of the second TFT. In addition, a pixel electrode which will be used as the second electrode of the sensor capacitor Cts is positioned above the first electrode of the sensor capacitor Cts. The pixel electrode and a drain terminal of the second TFT are connected to a gate terminal of the first TFT. A source terminal of the first TFT is connected to the sensing voltage supply line Vcs, and a drain terminal of the first TFT is connected to the touch line TLi.

In this embodiment, the capacitance Ccts of the sensor capacitor Cts of the sensor capacitor 102 changes as a result of a user's touch action. A voltage Vgw of the first node N in the touch sensor 102 also changes. The first switch S1 provided between the sensing voltage supply line Vcs and the touch line TLi is turned on or off by the voltage Vgw of the first node N. The presence of a touch action is determined by adjusting the amount of current applied from the sensing voltage supply line Vcs to the touch line TLi.

The operation of the touch sensor 102 with the aforementioned configuration is as follows. The operation of the touch sensor will be described on the basis of the charge amount at the first node N.

Since the size of the first TFT of the first switch S1 is large, parasitic capacitors are formed between a gate electrode and a source line and between the gate electrode and a data line. At this time, the parasitic capacitor formed between the gate electrode and the source line is referred to as a first parasitic capacitor Cgs. The parasitic capacitor formed between the gate electrode and the data line is referred to as a second parasitic capacitor Cgd.

Figure 16:
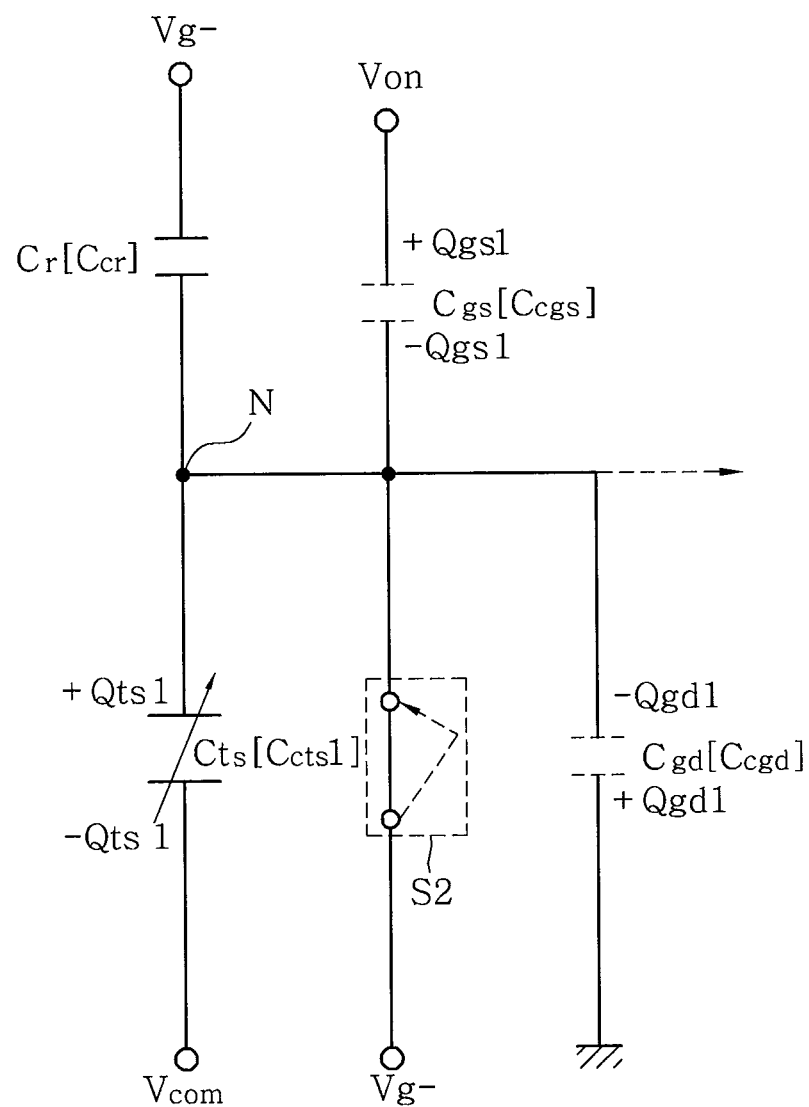
FIGS. 16 to 19 are conceptual illustrations of the operation of the touch sensor according to the second exemplary embodiment of the present invention.

When the second switch S2 is turned on as shown in FIG. 16, the charge amount Q of the first node N is expressed by the following Equation 11.

$$Q = Q_{ts1} - Q_{gs1} - Q_{gd1} \tag{11}$$

When an off voltage Vg− corresponding to the gate turn-off signal SVg− is applied to the (j-1)-th gate line Gj-1 while the second switch S2 is turned on, a charge amount corresponding to the off voltage Vg− is charged into the first node N. The three capacitors (i.e., the sensor capacitor Cts, the first parasitic capacitor Cgs and the second parasitic capacitor Cgd) become connected to the first node N. Thus, as described in Equation 11, the charge amount Q of the first node N is equal to the sum of charge amounts charged into the respective electrodes of the three capacitors.

The charge amounts of these three capacitors are expressed by the following Equation 12.

$$Qts1 = Ccts1 \times (Vcom - Vg^-)$$

$$Qgs1 = Ccgs \times (Von - Vg^-)$$

$$Qgd1 = Ccgd \times (-Vg^-) \quad (12)$$

The charge amount of a capacitor is provided by multiplying its capacitance by the voltage applied across the capacitor.

Figure 17:
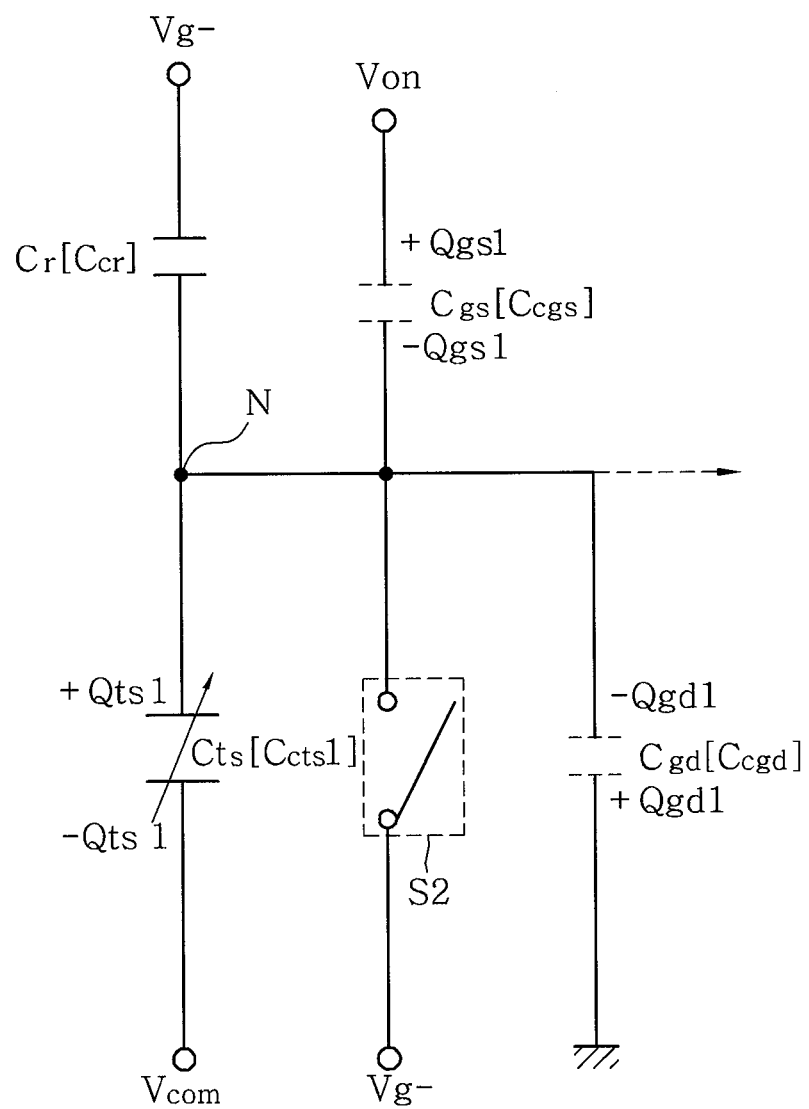

In FIG. 17, the second switch S2 is turned off, and the sensor capacitor Cts and the reference capacitor Cr becomes connected in series to the nodes to which the off voltage Vg− and the common voltage Vcom are respectively applied and the first node N maintains the charge amount Q.

Figure 18:
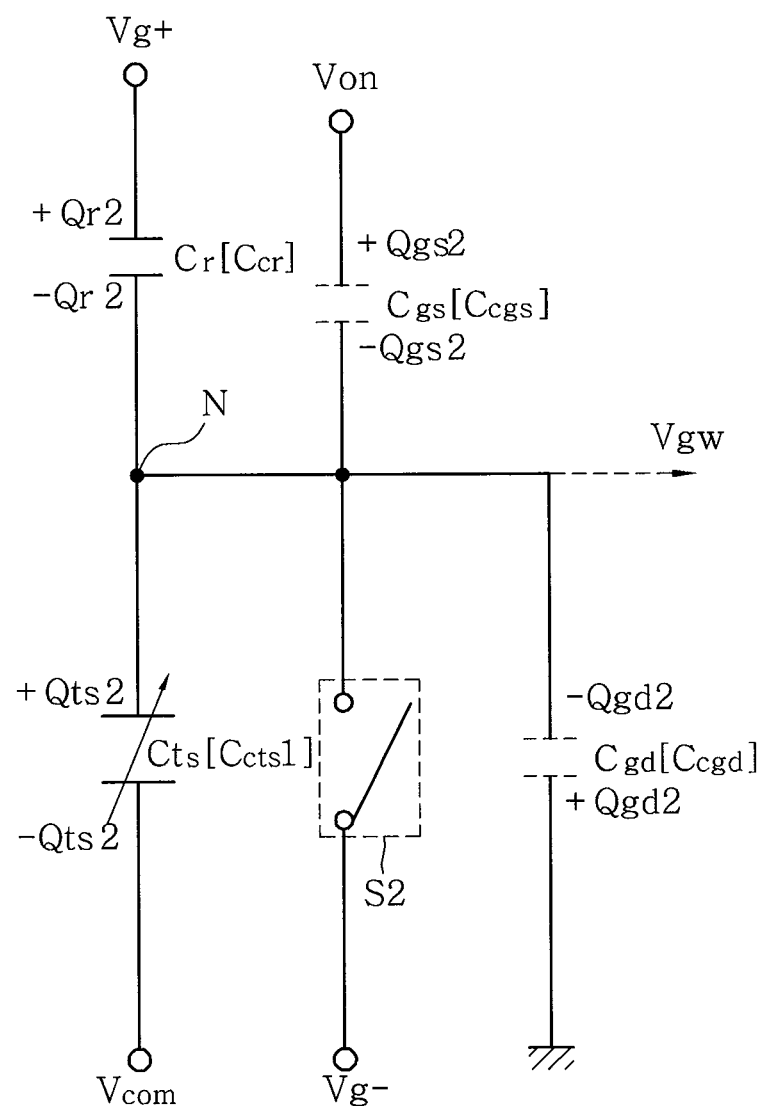

Subsequently, if a gate turn-on signal SVg+ is applied to the (j-1)-th gate line Gj-1, the voltage of one electrode of the reference capacitor Cr is changed from the off voltage Vg− to a turn-on voltage Vg+ corresponding to the gate turn-on signal SVg+, as shown in FIG. 18. Thus, the charge amount Q of the first node N changes.

When the voltage of the one electrode of the reference capacitor Cr changes, the charge amount Q of the first node N is expressed by the following Equation 13.

$$Q = Qts2 - Qr2 - Qgs2 + Qgd2 \quad (13)$$

The charge amount Q of the first node N is equal to the sum of charge amounts of the sensor capacitor Cts, the reference capacitor Cr, the first parasitic capacitor Cgs and the second parasitic capacitor Cgd. The respective charge amounts of the sensor capacitor Cts, the reference capacitor Cr, the first parasitic capacitor Cgs, and the second parasitic capacitor Cgd are expressed by the following Equation 14.

$$Qts2 = Ccts1 \times (VGw - Vcom)$$

$$Qr2 = Ccr \times (Vg^+ - VGw)$$

$$Qgs2 = Ccgs \times (Von - VGw)$$

$$Qgd2 = Ccgd \times VGw \quad (14)$$

Here, the charge amount Q of the first node N in Equation 11 is equal to the charge amount Q of the first node N in Equation 13. Using this charge amount Q, the voltage VGw applied to the first node N is expressed by the following Equation 15.

$$\begin{aligned} Q &= -Qts1 - Qgs1 - Qgd1 \\ &= Qts2 - Qr2 - Qgs2 + Qgd2 - \\ &\quad Ccts1 \times (Vcom - Vg^-) - CCgs \times (Von - Vg^-) + \\ &\quad Ccgd \times (-Vg^-) \\ &= Ccts1 \times (VGw \times Vcom) - Ccr \times (Vg^+ - VGw) - \\ &\quad Ccgs \times (Von - Vgw) + Ccgd \times VGw \end{aligned} \quad (15)$$

$$VGw = \frac{CcrVg^+ + (CCts1 + Ccgs + Ccgd)Vg^-}{(Ccts1 + Ccr + Ccgs + Ccgd)}$$

Therefore, the voltage VGw of the first node N changes with the capacitance Ccts of the sensor capacitor Cts since the turn-on voltage Vg+, the turn-off voltage Vg−, the capacitance Ccr of the reference capacitance Ccr, and the first and second parasitic capacitors Ccgs and Ccgd are fixed values.

Figure 19:
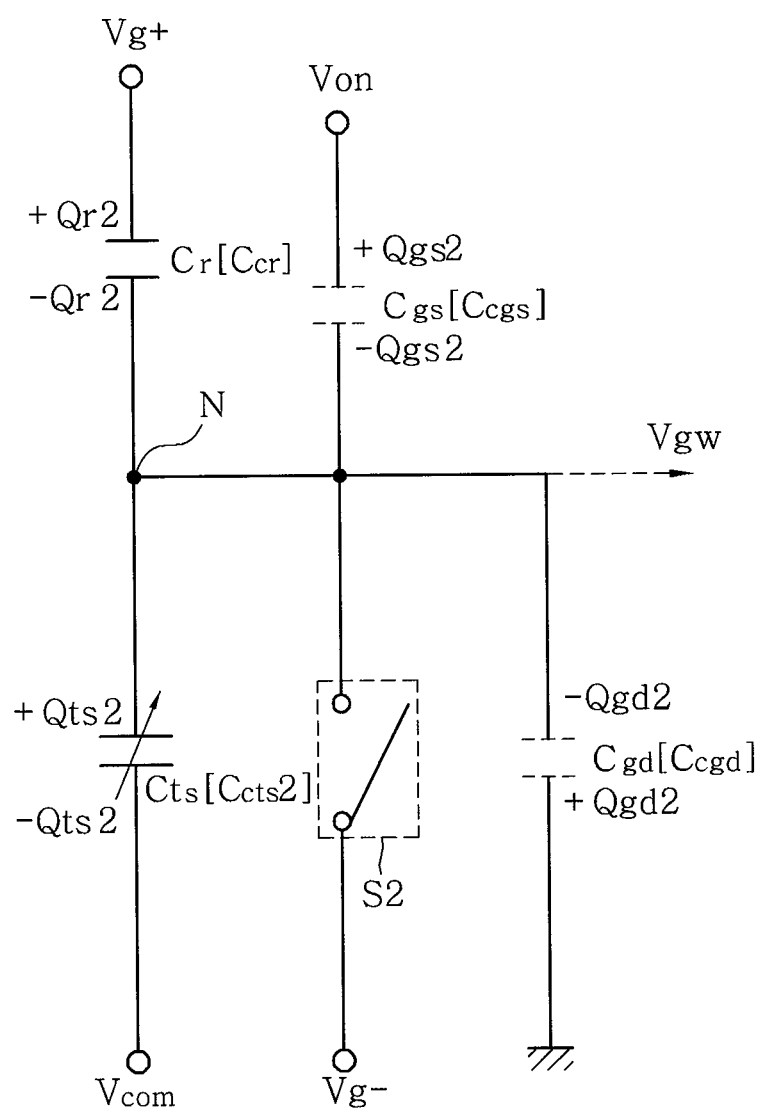

When the capacitance of the sensor capacitor Cts is changed from Ccts1 to Ccts2 by a user's touch action as shown in FIG. 19, the voltage of the first node is described as follows.

Since the capacitance Ccts of the sensor capacitor Cts is changed by the user's touch action, the charge amount Qts 2 charged into the sensor capacitor Cts also changes. That is, the changed charge amount Qts 2 of the sensor capacitor Cts is expressed by the following Equation 16.

$$Qts2 = Ccts2 \times (VGw - Vcom) \quad (16)$$

If Equation 15 is reformulated by substituting Equation 16 into Equation 15, the following Equation 17 is derived.

$$\begin{aligned} Q &= -Qts1 - Qgs1 - Qgd1 \\ &= Qts2 - Qr2 - Qgs2 + Qgd2 - \\ &\quad Ccts1 \times (Vcom - Vg^-) - CCgs \times (Von - Vg^-) + \\ &\quad Ccgd \times -Vg^- \\ &= Ccts1 \times (VGw \times Vcom) - Ccr \times (Vg^+ - VGw) - \\ &\quad Ccgs \times (Von - Vgw) + Ccgd \times VGw \end{aligned} \quad (17)$$

$$VGw = \frac{CcrVg^+ + (Ccts2 - Ccts1)Vcom + (Ccts + Ccgs + Ccgd)Vg^-}{(Ccts2 + Ccr + Ccgs + Ccgd)}$$

When a user touches the TSP 100, the voltage VGw of the first node N in the corresponding touch sensor 102 changes as described in Equation 17. The amount of current that flows from the sensing voltage supply line Vcs to the touch line TLi through the first switch S1 changes due to a change in the voltage of the first node N in the touch sensor 102. This means that the channel width of the first TFT used as the first switch S1 is changed and the amount of current that flows into the touch line TLi changes depending on the presence of a touch action.

The integration circuit 611 outputs output voltages Vout of different levels depending on the amount of current that flows into the touch line TLi. The output voltage Vout outputted when no touch action is made has a different voltage level from the output voltage Vout outputted when a touch action is made. Therefore, the presence of a touch action can be determined using a voltage level difference between the output voltages Vout, and the coordinate of a region in which a touch action is made can be calculated.

FIG. 21 is a graph showing simulation results of a change in output voltage of an integration circuit unit depending on a change in cell gap of the TSP according to the second embodiment of the present invention. The following Table 2 shows the simulation results of FIG. 21. In the simulation, the common voltage Vcom is 3V, and the capacitance Cco of the output capacitor Co is 50 pF. The off-voltage Vg− is −7V.

TABLE 2

|  | Cell gap (μm) | | | | | |
| --- | --- | --- | --- | --- | --- | --- |
|  | 0.6 | 0.5 | 0.4 | 0.3 | 0.2 | 0.1 |
| Capacitance (pF) of sensor capacitor | 0.23 | 0.28 | 0.35 | 0.46 | 0.07 | 1.39 |

TABLE 2-continued

| | Cell gap (μm) | | | | | |
|---|---|---|---|---|---|---|
| | 0.6 | 0.5 | 0.4 | 0.3 | 0.2 | 0.1 |
| Capacitance (pF) of reference capacitor | 0.40 | 0.40 | 0.40 | 0.40 | 0.40 | 0.40 |
| Voltage (V) of first node | 10.30 | 9.26 | 8.00 | 6.34 | 3.78 | −0.25 |
| Output voltage (V) of integration circuit unit | 2.03 | 1.61 | 1.18 | 0.69 | 0.31 | 0.00 |

As shown in Table 2 and FIG. 21, when the cell gap in the TSP 100 is 0.6 μm, the voltage of the first node N in the touch sensor 102 is 10.30V, and the output voltage Vout of the integration circuit unit 611 is 3.03V. However, when the cell gap in the TSP 100 is reduced to 0.2 μm by a user's touch action, the voltage at the first node N is 3.78V, and the output voltage Vout of the integration circuit 611 is 0.31V.

Thus, the output voltage Vout of the integration circuit 611 changes with the capacitance Ccts of the sensor capacitor Cts. The capacitance Ccts of the sensor capacitor Cts changes with the cell gap of the TSP 100 and the cell gap of the TSP 100 is changed by the force applied when the TSP 100 is touched.

It has been described in this embodiment that a TFT liquid crystal display panel is used as a device for displaying images in the touch screen apparatus. However, the present invention is not limited by the the display panel type. Various types of display panels, such as a plasma display panel (PDP), may be used.

As described above, according to the embodiments of the present invention, the capacitance of a sensor capacitor is changed by the force applied to a TSP when a touch action is made, so that the electrical energy of one node of a touch sensor is changed, thereby a touch position is detected using the changed electrical energy of the node.

Also, according to embodiments of the present invention, the presence of a touch action and the touch position can be detected by directly sensing a change in the charge amount of one node of a touch sensor.

In addition, according to the embodiments of the present invention, the presence a touch action and the touch position can be detected by controlling a switch which provides a sensing signal to a touch line to be turned on/off depending on a change in the voltage of one node of a touch sensor.

Further, according to the embodiment of the present invention, gate lines can be used as lines for obtaining horizontal coordinate positions.

Furthermore, according to the embodiments of the present invention, since the capacitance of a sensor capacitor changes with a cell gap of a TSP, the sensitivity is variable and can be adjusted.

Also, according to the embodiments of the present invention, since a touch position is not detected using a direct contact between upper and lower lines but a change in cell gap, a process margin can be sufficiently secured for TSP manufacturing, and the manufacturing process can be simplified.

Although the present disclosure of invention has been illustrated in connection with the accompanying drawings and the preferred embodiments, the present teachings are not limited thereto. It will be understood by those skilled in the art in light of the foregoing that various modifications and changes can be made thereto without departing from the spirit and scope of the present disclosure of invention.

What is claimed is:

1. A touch screen apparatus, comprising:
 a touch line; and
 a plurality of touch sensors coupled to the touch line,
 wherein each of the plurality of touch sensors comprises:
   a first node;
   a sensor capacitor operatively coupled to the first node for changing an electrical state of the first node depending on a respective touch action;
   a reference capacitor operatively coupled to the first node;
   a first switch having at least two respective terminals, the first switch being interposed between and coupled by way of two of the respective terminals thereof respectively to the first node and to the touch line such that when the first switch is activated, it provides a sensing signal from the first node to the touch line; and
   a second switch having at least two respective terminals, the second switch being interposed between and coupled by way of two of the respective terminals thereof to the first node and to a reference voltage providing node such that when the second switch is activated, it supplies a reference voltage to the sensor capacitor and it simultaneously discharges or charges the reference capacitor.

2. The touch screen apparatus as claimed in claim 1, further comprising a touch sensing unit coupled to the touch line and configured for outputting a sensing voltage according to a respective sensing signal coupled to the touch line by a respective one of the plurality of touch sensors.

3. The touch screen apparatus as claimed in claim 2, further comprising:
 a plurality of display elements each having at least one of the touch sensors and further having at least one pixel configured for displaying an image, the plurality of display elements being arranged in a matrix;
 a plurality of touch lines, including said first recited touch line, each of the plurality of touch lines extending in a first direction and being connected to respective ones of the touch sensors in the display elements that are correspondingly arranged in the first direction and adjacent to the respective touch line; and
 a plurality of sensing readers in the touch sensing unit that are each connected to one of the plurality of touch lines.

4. The touch screen apparatus as claimed in claim 3, wherein each of the plurality of sensing readers comprises:
 an integration circuit configured for outputting an output voltage, wherein the voltage level of the output voltage depends on an amount of charge provided by a respective sensing signal conveyed by the corresponding touch line;
 an amplifier for amplifying the output voltage of the integration circuit; and
 an analog-to-digital converter configured for converting the amplified output voltage into a digital signal.

5. The touch screen apparatus as claimed in claim 1, further comprising a pixel having a liquid crystal capacitor in which a pixel electrode is used as a first electrode and a common electrode is used as a second electrode of the liquid crystal capacitor,
 wherein a first electrode of the sensor capacitor is formed on the same plane as the pixel electrode to be connected to the first node, and the common electrode is used as a second electrode of the sensor capacitor.

6. The touch screen apparatus as claimed in claim 1, further comprising:
a reference voltage supply line coupled so as to be supplied with a reference voltage and coupled to the reference capacitor.

7. The touch screen apparatus as claimed in claim 1, further comprising a plurality of gate lines each connected to one of the plurality of touch sensors, the plurality of gate lines being coupled for sequentially receiving a gate turn-on voltage,
wherein the first switch is controlled by a first gate line, the second switch is controlled by a second gate line that receives the gate turn-on voltage after the first gate line, and the first switch is connected to the first node and the touch line.

8. The touch screen apparatus as claimed in claim 7, wherein a first thin film transistor (TFT) is used as the first switch, a gate terminal of the first TFT is connected to the first gate line, a source terminal of the first TFT is connected to the first node, and a drain terminal of the first TFT is connected to the touch line, and
wherein a second TFT is used as the second switch, a gate terminal of the second TFT is connected to the second gate line, a source terminal of the second TFT is connected to a reference voltage supply line supplied with a reference voltage, and a drain terminal of the second TFT is connected to the first node.

9. The touch screen apparatus as claimed in claim 1, further comprising a sensing voltage supply line coupled so as to be supplied with a sensing voltage,
wherein the first switch is connected to the sensing voltage supply line and to the touch line, and the sensing voltage is applied as the sensing signal to the touch line when the first switch is activated by a sensing voltage signal supplied by the sensing voltage supply line.

10. The touch screen apparatus as claimed in claim 9, further comprising:
a plurality of gate lines respectively connected to the plurality of touch sensors; and
wherein the reference capacitor is connected to the first gate line and the first node.

11. The touch screen apparatus as claimed in claim 10, wherein the first switch is is responsive to a signal level of the first node, and the second switch is controlled by the second gate line which receives the gate turn-on voltage after the first gate line.

12. The touch screen apparatus as claimed in claim 11, wherein a first TFT is used as the first switch, a gate terminal of the first TFT is connected to the first node, a source terminal of the first TFT is connected to the sensing voltage supply line, and a drain terminal of the first TFT is connected to the touch line, and
wherein a second TFT is used as the second switch, a gate terminal of the second TFT is connected to the second gate line, a source terminal of the second TFT is connected to the first gate line, and a drain terminal of the second TFT is connected to the first node,
the first TFT being larger in size than the second TFT.

13. The touch screen apparatus as claimed in claim 11, further comprising a reference voltage supply line supplied with a reference voltage,
wherein a second TFT is used as the second switch, a gate terminal of the second TFT is connected to the second gate line, a source terminal of the second TFT is connected to the reference voltage supply line, and a drain terminal of the second TFT is connected to the first node.

14. A touch screen apparatus, comprising:
a touch line;
first and second reference voltage providing lines respectively configured to supply respective first and second reference voltages;
first and second gate lines coupled so as to be sequentially supplied with a gate turn-on voltage followed by a gate turn-off voltage; and
a plurality of touch sensors,
wherein each of the plurality of touch sensors comprises:
a first node;
a sensor capacitor connected to the first node and the first reference voltage providing line;
a reference capacitor connected to the first node and the second reference voltage providing line;
a first switch configured for connecting the first node and the touch line, the first switch being controlled by a signal provided to the first gate line; and
a second switch configured for connecting the first node and the second reference voltage providing line, the second switch being controlled by a signal provided to the second gate line.

15. The touch screen apparatus as claimed in claim 14, further comprising a pixel including a liquid crystal capacitor having a pixel electrode, a liquid crystal layer and a common electrode,
wherein the common electrode is used as the first line.

16. The touch screen apparatus as claimed in claim 15, wherein a storage line or a reference voltage supply line is used as the second line, and the reference voltage supply line is supplied with a reference voltage that is lower than a voltage applied to the common electrode.

17. The touch screen apparatus as claimed in claim 14, wherein a charge amount of the first node depends on a capacitance of the sensor capacitor,
the touch screen apparatus further comprising a sensing reader connected to the touch line whereby an output voltage level of the sensing reader depends on the charge amount of the first node.

18. The touch screen apparatus as claimed in claim 14, further comprising:
a lower substrate having a first electrode of the sensor capacitor formed thereon; and
an upper substrate having a second electrode of the sensor capacitor formed thereon, wherein a distance between the first and the second electrodes of the sensor capacitor is changed by a touch action.

19. The touch screen apparatus as claimed in claim 1 wherein, when the second switch is activated, it discharges the reference capacitor.

* * * * *